United States Patent [19]
Gehring

[11] Patent Number: 5,378,027
[45] Date of Patent: Jan. 3, 1995

[54] FITTING FOR CABLES AND THE LIKE

[75] Inventor: Peter Gehring, Simonswald-Griesbach, Germany

[73] Assignee: Anton Hummel Verwaltungs GmbH, Waldkirch, Germany

[21] Appl. No.: 930,729

[22] Filed: Aug. 14, 1992

[30] Foreign Application Priority Data

Aug. 16, 1991 [DE] Germany .............. 4127162

[51] Int. Cl.$^6$ .............................. F16L 21/06
[52] U.S. Cl. ...................... 285/322; 285/354
[58] Field of Search ............. 285/322, 323, 354

[56] References Cited

U.S. PATENT DOCUMENTS

| | | | |
|---|---|---|---|
| 2,015,541 | 9/1935 | Weatherhead, Jr. | 285/354 |
| 3,895,832 | 7/1975 | Ellis et al. | 285/322 |
| 4,250,348 | 2/1981 | Kitagawa | 285/322 |
| 4,767,135 | 8/1988 | Holzmann | 285/322 |
| 4,787,657 | 11/1988 | Henniger | 285/323 |
| 5,048,872 | 9/1991 | Gehring | 285/92 |

FOREIGN PATENT DOCUMENTS

| | | | |
|---|---|---|---|
| 0203269 | 11/1987 | European Pat. Off. | |
| 0322625 | 7/1989 | European Pat. Off. | |
| 889097 | 9/1953 | Germany | 285/354 |
| 8415525 | 10/1984 | Germany | |
| 3903354 | 2/1990 | Germany | |
| 4021731 | 7/1991 | Germany | |
| 2013420 | 8/1979 | United Kingdom | |

Primary Examiner—P. Austin Bradley
Assistant Examiner—Jeffrey T. Knapp
Attorney, Agent, or Firm—Darby & Darby

[57] ABSTRACT

A fitting for engagement with the outer surface of a cable has a sleeve with an external thread adjacent one of its ends and a nut having a complementary internal thread at one of its ends. The one end of the sleeve is of one piece with or supports a tubular clamping device with an annulus of axially parallel flexible prongs alternating with elongated slots. The nut has a ring-shaped internal deforming surface which flexes the prongs radially inwardly toward the axis of the clamping device, and toward the outer surface of a cable extending through the sleeve and the nut, when the sleeve is threaded into the nut. The prongs have relatively thick portions which are remote from the sleeve and relatively thin, and hence more readily flexible, portions between the thick portions and the sleeve. The thick portions of the prongs can bear directly against the outer surface of a cable or against a deformable tubular seal which is placed between the prongs and the cable. The internal and/or external surface of the seal is profiled to ensure predictable deformation regardless of the diameter of the cable.

87 Claims, 10 Drawing Sheets

FITTING FOR CABLES AND THE LIKE

BACKGROUND OF THE INVENTION

The invention relates to improvements in fittings of the type disclosed in commonly owned U.S. Pat. No. 5,048,872, granted Sep. 17, 1991, for "Fitting for cables, tubes and the like". The disclosure of this patent is incorporated herein by reference.

Fittings of the type to which the present invention pertains include an externally threaded first component (e.g., a sleeve), an internally threaded second component (e.g., a nut) which can be moved into mesh with the first component, and a set of prongs which can be flexed to engage the outer surface of a rod, cable, tube, hose or other object or article extending through aligned coaxial passages of the two components. The flexing is effected by an annular deforming surface which is provided in one of the components and engages the end faces of the prongs in response to threading of the first component into the second component.

Conventional fittings of the above outlined character are furnished in several sizes, and each size is designed to be used with articles or objects having outer diameters within a particular range. Thus, a first fitting will be used to sealingly and/or clampingly engage the outer surfaces of articles having a diameter within a relatively narrow first range, a second fitting will be used to sealingly and/or clampingly engage the outer surfaces of articles having a diameter within a relatively narrow second range, and so forth. In many instances, the externally and/or internally threaded components of such fittings are made of a plastic material which can create problems if the connection between the fitting and a rod-shaped or tubular article is to withstand pronounced tensional stresses. The situation is aggravated if the connection is also called upon to establish a fluid-tight seal at the locus of engagement of flexed prongs with the outer surface of a rod-shaped or tubular object or article.

The rules and regulations by authorities in many countries also create problems in connection with the making and using of fittings of the above outlined character. For example, the authorities in charge of regulating the utilization of such fittings in certain countries prescribe identical norms for all sizes of fittings. Thus, the prescribed tensional stress to be withstood by a fitting which is designed to engage articles of small or very small diameter is the same as that to be withstood by much larger fittings which are designed to clampingly engage and/or establish sealing connections with articles having a large or very large diameter. In actual practice, a fitting which is designed to clampingly and/or sealingly engage an article having a relatively small diameter cannot withstand the stresses which are expected to be withstood by a fitting for use with articles having larger or very large diameters. In other words, whereas certain sizes of fittings meet the prescribed norms, the remaining sizes cannot be put to use because the regulations cannot be met when the fitting is designed to engage a workpiece having a small or very small outer diameter. Additional problems arise because the authorities in many countries prescribe the materials which can be used to make the parts of the fittings. This greatly reduces the selection of materials which can be used to make fittings capable of satisfying the aforediscussed strict requirements.

Many authorities also prescribe the dimensions and the nature of internal and external threads on the components of fittings for use in connection with cables or the like, and the authorities even prescribe the dimensions and the shape of normally polygonal portions of nuts and sleeves which are provided to facilitate engagement by a wrench, by pliers or by any other suitable tool which must be used to hold the respective component against rotation and/or to rotate the particular component relative to the other component or components. Still further, the authorities in certain countries even prescribe the range of outer diameters of workpieces which can be used in conjunction with fittings of a particular size. In other words, the regulations in many countries are of such nature that the manufacturer is free to select only the size and/or the shape of the flexible prongs, of the deforming surface or surfaces and possibly the size and/or shape of discrete seals which are to be used in order to establish a sealing connection between the fitting and the rod-shaped or tubular article which is to be sealingly and/or clampingly engaged by the fitting. Even these parameters cannot be selected at will because the maker of the fittings is required to avoid designs which would necessitate the application of large forces in order to drive the externally threaded component into the internally threaded component and to thereby flex the prongs toward sealing and/or clamping engagement with the outer surface of a rod-shaped or tubular article which extends through the aligned axial passages of such components. Still further, the manufacturer must take into consideration the requirement to maintain the overall length of the partly assembled or fully assembled fitting within a desired range. The inclination of the deforming surface which is caused to flex the prongs in response to penetration of the externally threaded component into the internally threaded component of the fitting determines the torque which must be applied to assemble the fitting with an article as well as the overall length of the fully assembled fitting.

German Utility Model No. G 84 15 525.6 of Holzmann (published Oct. 11, 1984) discloses a threaded fitting which can be used with cables and is characteristic of numerous presently available fittings serving to clampingly and/or sealingly engage the outer surface of a cable or the like. The dimensions (particularly the radial dimensions) of the prongs in the fitting of Holzmann are selected in such a way that they provide room for insertion of a relatively thick cylindrical seal. The seal is deformed into fluidtight engagement with the outer surface of an article to be clamped in response to radially inward flexing of the prongs. This is achieved by reducing the thickness of the prongs accordingly, i.e., the prongs are rather thin as measured in a direction radially of the tubular component which carries the prongs. The thin prongs provide adequate clearance for insertion of a relatively thick cylindrical seal which is biased against the outer surface of an article when the fitting of Holzmann is assembled. The fitting of Holzmann further exhibits the feature (which, at a first glance, could be interpreted as an advantage) that a relatively small torque suffices to engage the fitting with a cable or the like because the relatively thin and readily flexible prongs as well as the rather thick elastic seal can be readily deformed in response to penetration of the externally threaded component into the internally threaded component. Of course, such fittings cannot offer a pronounced resistance to a pull, i.e., to axial movement of the fitting relative to a cable and/or vice versa.

Holzmann proposes to further weaken the relatively thin and readily flexible prongs by the provision of a recess in that end portion of each prong which is of one piece with the adjacent axial end of the externally threaded component. Such recess is provided in the external surfaces of the prongs and its depth approximates half the thickness of a prong. The recess ensures that each prong is flexed at a point adjacent the closed ends of axially parallel slots which alternate with the prongs. Initial flexing of the prongs about pivot axes at the external recess can be effected in response to the exertion of a relatively small force (torque). However, such force must be increased rather abruptly when the prongs are thereupon bent intermediate their ends in response to further penetration of the externally threaded component into the internally threaded component. In fact, the torque which must be applied to deform the prongs between their ends is just as large as that which is required to flex prongs having no recesses of the type proposed by Holzmann.

Proposals to influence the function of fittings include the provision of prongs having a particular size and shape in order to enhance the clamping force between the prongs and a cable or the like as well as to enhance the ability of the assembled fitting to resist tensional stresses. The proposals have met with some success in connection with the making of relatively large fittings for engagement with articles having a large outer diameter but they have failed when a fitting is to be brought into clamping and sealing engagement with articles (e.g., cables) having a relatively small outer diameter. For example, it was proposed to employ relatively long prongs in order to ensure the establishment of large-area contact between a deformed prong and the outer surface of an article or between a deformed prong and a tubular seal which is to be inserted between the prongs and the outer surface of the article. The relatively long prongs are likely to project from the passage of the internally threaded component before the threading of the externally threaded component into the internally threaded component is completed. This does not entail any further increase of the clamping and/or sealing action. Since the prongs are relatively thin, those portions of such prongs which extend outwardly beyond the internally threaded component of the fitting are likely to be bent radially outwardly by an article which is elastically or resiliently deformable and has stored energy during application of the fitting. Such outward flexing weakens the sealing and/or clamping action and hence the resistance of the applied fitting to stand pronounced tensional stresses in a direction to move it axially of the article. The reason is that only those portions of the deformed prongs which do not project beyond the internally threaded component offer resistance to tensional and/or other stresses which develop when the fitting is applied in order to clampingly and/or sealingly engage a cable or the like.

Relatively thick cylindrical seals also exhibit a number of drawbacks. The main drawback is that the thickness of the seal can be increased only by reducing the thickness of the prongs; this creates the aforediscussed problems. The reason for the utilization of rather thick cylindrical seals is that they are less likely to undergo unpredictable deformation during flexing of the prongs against the external surface of a seal. However, a relatively thick seal must undergo very pronounced radial deformation before it can establish a reliable sealing and frictional engagement with the outer surface of a rod-shaped or tubular article. If the seal is not subjected to pronounced deformation, it merely acts as a cushion and can readily slide along the outer surface of a cable or the like. The forces which must be applied in order to adequately constrict a relatively thick cylindrical seal are often so large that the densification of the material of the constricted seal results in the generation of a radially outwardly directed reaction force which must be taken up by the externally threaded component of the fitting. Such problem is likely to arise when the fitting is relatively small and is to be applied to an article having a small or very small outer diameter. It has been found that the reaction force is likely to cause bursting or cracking of the threaded components, especially in the region of their threads. Moreover, further rotation of the mating components cannot result in additional stressing of the seal, i.e., such rotation does not result in further penetration of the externally threaded component into the internally threaded component because the two threads are out of mesh. Attempts to overcome such problems involve the formation of specifically designed threads having deeper grooves; this even further reduces the ability of the corresponding components to withstand the aforediscussed reaction forces.

All in all, heretofore known fittings are incapable of satisfying the requirements which are prescribed by authorities and/or the requirements by users of the fittings. Such requirements include shortness of the fully assembled fitting, elimination of the danger of destruction under the influence of reaction forces, assembly with a cable or the like in response to the application of a relatively small force, and the ability of a fitting to be connectable with articles having relatively small or relatively large outer diameters.

OBJECTS OF THE INVENTION

An object of the invention is to provide a fitting for tubular or rod-shaped articles which can be assembled to occupy a small amount of space in the axial direction of its mating components.

Another object of the invention is to provide a fitting which can establish and maintain pronounced clamping and/or sealing forces even if the outer diameter of the clamped article is small.

A further object of the invention is to provide a fitting which can stand pronounced tensional stresses.

An additional object of the invention is to provide a fitting whose components can be assembled in response to the application of a relatively small force.

Still another object of the invention is to provide a fitting which can be used with articles having outer surfaces of a large, medium-sized or small diameter.

A further object of the invention is to provide a fitting whose components can be mass produced at low cost.

Another object of the invention is to provide a fitting wherein the prongs are configurated in a novel and improved way.

An additional object of the invention is to provide a novel and improved seal for use in the above outlined fitting.

Still another object of the invention is to provide a novel and improved combination of a tubular seal and an annulus of flexible prongs for use in the above outlined fitting.

A further object of the invention is to provide the fitting with novel and improved means for preventing undesirable deformation of the seal.

Another object of the invention is to provide novel and improved internally threaded and externally threaded components for use in the above outlined fitting.

An additional object of the invention is to provide the fitting with novel and improved means for flexing the prongs toward engagement with a seal or directly against the outer surface of a cable or the like.

Still another object of the invention is to provide a fitting which is constructed and assembled in such a way that the clamping and/or sealing action upon a cable or the like can be selected and maintained with a high degree of accuracy and reproducibility.

A further object of the invention is to provide a novel and improved separately produced set of prongs for use in the above outlined fitting.

SUMMARY OF THE INVENTION

One feature of the invention resides in the provision of a fitting which can be used to clampingly engage outer surfaces of tubes, hoses, cables, pipes or analogous articles or workpieces. The improved fitting comprises first and second tubular components each of which has a first end and a second end, and the first and second components respectively have complementary external and internal threads at their first ends. One of the first and second components has a substantially ring-shaped internal deforming surface and an axial article-receiving passage adjacent the deforming surface. The passage has an inner diameter which is smaller than the root diameter of one of the threads, and the fitting further comprises a tubular (e.g., substantially cylindrical) clamping device which is carried by the other component. The clamping device comprises an annulus of substantially axially parallel deformable prongs and elongated slots which alternate with the prongs. Each slot has a closed end and an open end, and each prong has an end face at the open ends of the adjacent slots., an internal surface confronting the axis of the clamping device, and an external surface. The clamping device is disposed at the first end of the other component, and the end faces of its prongs are engaged and moved by the deforming surface of the one component radially inwardly of the clamping device in response to screwing or threading of the components into each other. At least some of the prongs have first portions of greater radial thickness and second portions of lesser radial thickness, and the thickness of the first portions is at least 60 percent of the difference between the diameter of the passage (i.e., the maximum diameter of an article which is to extend through the passage) and the root diameter of the one thread.

The fitting is preferably furnished with a deformable (e.g., elastic) annular seal which is disposed within the annulus of prongs and is biased at least by the first portions of the at least some prongs against the outer surface of an article extending through the passage; such biasing takes place in response to radially inward movement of the end faces of prongs under the action of the deforming surface.

The thickness of the first portions of the at least some prongs can be at least 75 percent of the difference between the aforementioned diameters. In fact, the thickness of the first portions of the at least some prongs can at least approximate the difference between the two diameters.

The first portions of the at least some prongs can extend radially inwardly and/or outwardly of the clamping device beyond the respective second portions.

Each of the at least some prongs can include more than a single first portion and/or more than a single second portion. The arrangement may be such that the first portions of the at least some prongs are disposed at the open ends of the adjacent slots and the second portions of such prongs are disposed between the respective first portions and the closed ends of the adjacent (neighboring) slots, i.e., the first portions of the at least some prongs can be spaced apart from the closed ends of the adjacent slots.

The length of each first portion can be at most two-thirds of the length of the respective prong. For example, the length of each first portion can equal or approximate one-half or as little as one-third of the length of the respective prong.

If the second portions are nearer to the closed ends of the adjacent slots than the respective first portions, satisfactory deformation of the at least some prongs can be achieved by selecting the radial thickness of the second portions in such a way that it decreases along approximately half the distance from the respective first portions toward the closed ends of the adjacent slots. The first portions of such prongs can extend radially inwardly and/or radially outwardly beyond the respective second portions.

The internal and/or the external surface of each of the at least some prongs can be provided with a facet between the respective first and second portions. The facets can extend substantially radially of the clamping device and they can be concave or flat or they can make oblique angles with the axis of the clamping device.

The maximum extent of deformability of the prongs depends upon the parameters of an article which extends through the passage of the one component. Such parameters include, among others, the elasticity or deformability of the article, the diameter of the outer surface of the article in deformed condition, and the ductility of a non-elastic article. The ratio of the length of the first portions to the length of the respective second portions of the at least some prongs can be selected in such a way that those portions of the external surfaces of the at least some prongs which are provided on the first portions contact the deforming surface even during maximum deformation of the at least some prongs.

It is also possible to select the length of the second portions of the at least some prongs in such a way that each second portion extends at most into the passage of the one component in response to maximum deformation of the respective prong. The length of each second portion can be selected with a view to at most equal 3T wherein T is the radial thickness of a second portion.

The clamping device can be provided with an annular socket for one end portion of the annular seal, and such socket can be shallow or it can extend axially of the clamping device beyond the closed ends of the slots in a direction away from the end faces of the prongs.

The outer surface of an article which fills or only partially fills the passage of the one component defines with the annulus of prongs an annular clearance in undeformed condition of the prongs, and the seal is preferably dimensioned in such a way that it at least partially fills the clearance even before it is biased against the outer surface of the article in the passage in response to deformation of the prongs by the deforming surface of the one component.

The passage is disposed radially inwardly of the first component when the two components are threadedly connected to each other, and the at least some prongs can be configurated and dimensioned in such a way that their first portions extend into the passage upon deformation of the prongs by the deforming surface of the one component.

The dimensions and the deformability of the at least some prongs can be selected in such a way that their second portions (which are adjacent the closed ends of the adjoining or neighboring slots) are bent toward the axis of the clamping device, in response to deformation of the prongs by the deforming surface of the one component, in a direction toward the outer surface of an article extending with clearance through the passage of the one component. Such second portions can make with the axis of the clamping device an oblique angle in response to deformation of the respective prongs, and the outline of each deformed second portion can have a turning point at or close to or at a distance from the respective first portion. Such outline can have a first curvature between the closed ends of the adjacent slots and the turning point, and a different second curvature between the turning point and the respective first portion.

The second portion of each of the at least some prongs can have a substantially S-shaped or Z-shaped outline in response to deformation of the respective prong by the deforming surface of the one component.

The length of the at least some prongs (between their end faces and the closed ends of the adjacent slots) can be selected in such a way that the first portions of the at least some prongs extend at least in part into the passage in response to deformation of the prongs toward the outer surface of an article which extends through the passage of the one component, particularly an article which extends through such passage with at least some clearance.

The deforming surface preferably tapers radially inwardly and axially of the one component toward the axially extending passage, and the first portions of the at least some prongs can be disposed at least in part within the passage in response to deformation of the at least some prongs by the deforming surface as a result of threading of the two components into each other. At such time, the second portions of the at least some prongs are or can be at least closely adjacent the deforming surface of the one component.

The slots include first portions which are disposed between the first portions of the neighboring prongs and second portions which extend between the second portions of the adjoining prongs. At least the first portions of such slots are or can be disposed in planes which bypass the axis of the clamping device; such second portions of the slots can be disposed in planes which are tangential to the external surface of a relatively small imaginary cylinder which is coaxial with and is located within the clamping device.

The first portions of the slots can be narrower than the second portions, e.g., to enhance the flexibility of second portions of the at least some prongs.

The end faces and/or the internal surfaces of the at least some prongs can be profiled to promote reliable frictional engagement with the deforming surface and-/or with the outer surface of an article which extends through the passage of the one component.

The number of prongs having thicker first portions and thinner second portions is preferably not less than three and can be ten or more.

The length of the first portions and/or the length of the second portions of all of the prongs which include such first and second portions may but need not be the same. Thus, the length of the first portion of at least one prong can exceed the length of the first portion of at least one other prong. Analogously, the length of the second portion of at least one prong can exceed the length of the second portion of at least one other prong. As already mentioned above, the first portions of the at least some prongs are or can be disposed at the free ends (i.e., at the end faces) of such prongs.

The orientation of the prongs having relatively long first portions with reference to the axis of the clamping device can depart from the orientation of prongs having relatively short first portions when such prongs are deformed by the deforming surface to bear against the deforming surface, against the surface surrounding the passage and/or against the outer surface of an article extending through the passage of the one component.

The clamping device may but need not be of one piece with the other component of the improved fitting.

The annular seal can be provided with a rim which is remote from the end faces of the at Least some prongs, and such rim can at least partially fill the aforementioned socket at the closed ends of the slots in the clamping device when the annulus of prongs surrounds the seal. The closed ends of the slots can be disposed at least close to the surface which forms part of the clamping device and surrounds the socket for the rim of the annular seal. The wider portions of the slots can be disposed at their closed ends, i.e., adjacent the socket for the rim of the annular seal. For example, the closed ends of the slots can be disposed at the level of the deepmost portion of the socket, as seen in the axial direction of the clamping device.

The clamping device can further comprise membranes each of which is integral with the prongs and extends across a portion of or across an entire slot at the external surfaces of the prongs.

The membranes can be adjacent the closed ends of the respective slots.

The clamping device can further comprise a skirt or barrier which is surrounded by the socket in the clamping device.

The thread of the other component can have a first turn at the socket. Alternatively, the first turn of such thread can be spaced apart from the socket in the axial direction of the other component. Still further, the closed ends of the slots can extend all the way into the thread of the other component.

The external faces of the first portions of the at least some prongs (such external faces form part of the external surfaces of the respective prongs) can engage an annular surface which surrounds the passage. Such engagement takes place in response to threading of the two components into each other. The annular surface surrounding the passage can have a conical shape or a substantially cylindrical shape.

The clamping device can constitute a discrete (separately produced) part which is separable from the other component. The first end of the latter is then provided with a preferably shallow recess for that axial end of the discrete clamping device which is remote from the end faces of the prongs.

The dimensions of the clamping device can be selected in such a way that the deforming surface of the one component is adjacent the closed ends of the slots when the two components are threaded into each other and an article extends through the passage of the one component. Such situation can develop even if the article extends through the passage with at least some clearance.

The deforming surface can engage or can be moved close to those sections of the prongs which are adjacent the first end of the other component; this takes place when the two components are threaded into each other.

The deforming surface can include a radially outer portion having a first inclination to the axis of the one component, and a radially inner portion having a different (e.g., more pronounced) second inclination relative to the axis of the one component. The width of the radially outer portion of the deforming surface can be different from the width of the radially inner portion; the width of the radially inner portion can exceed the width of the radially outer portion or vice versa. For example, the width of the radially outer portion can be twice the width of the radially inner portion, or the width of the radially inner portion can be twice the width of the radially outer portion (all as measured in the radial direction of the respective component).

The deforming surface can further include an intermediate portion between the radially inner and radially outer portions. Such intermediate portion can exhibit a more or less pronounced ring-shaped edge, or it can be convex to facilitate the sliding of the prongs along the deforming surface between the radially outer and radially inner portions of such surface in response to threading of the two components into each other.

Each of the radially inner and radially outer portions of the deforming surface can constitute a frustoconical surface, and the inclination or taper of the radially inner frustoconical surface can exceed the inclination or taper of the radially outer conical surface.

The first portions of the at least some prongs are preferably engaged by the frustoconical surface of more pronounced inclination during threading of the two components into each other.

The external surfaces of the prongs together form a composite substantially cylindrical surface whose diameter can match or approximate the root diameter of the one thread in undeformed condition of the prongs. The external faces of the first portions of the prongs can form a composite cylindrical surface whose diameter matches or approximates the root diameter of the one thread, and the external faces of the second portions of the at least some prongs can form a second composite cylindrical surface having a diameter which is smaller than the root diameter, i.e., the external faces of the second portions can be disposed radially inwardly of the external faces of the respective first portions.

The annular seal can be dimensioned and positioned within the annulus of prongs in such a way that it is engaged and deformed by the first portions of the at least some prongs due to radially inward movement of the end faces of the prongs under the action of the deforming surface in response to threading of the two components into each other. The seal can extend axially of the clamping device beyond the end faces of the prongs. It is also possible to select the dimensions and the axial position of the deformable seal in such a way that one of its axial ends is engaged by the deforming surface in response to threading of the two components into each other. It is equally possible to install and configurate the seal in such a way that it remains out of contact with the second portions of the at least some prongs, at least prior to deformation of the prongs by the deforming surface of the one component as a result of threading of the two components into each other.

The annular seal can comprise a relatively thin first portion which is engageable by the internal faces of the first portions of the at least some prongs, and a thicker second portion which is surrounded by the second portions of the at least some prongs. Such seal can extend all the say to or even beyond the end faces of the prongs.

The seal can comprise a reinforced or non-reinforced first axial end in the aforementioned annular socket of the clamping device, and a preferably reinforced second axial end at the end faces of the prongs. The end faces of the prongs can be provided with recesses for portions of the reinforced second axial end of the seal. In addition to or in lieu of such recesses, portions of the reinforced second axial end of the seal can extend into recesses which are provided therefor in the internal surfaces of the at least some prongs.

The internal and/or external surface of the annular seal can be provided with one or more circumferentially complete, helical, axially parallel and/or otherwise configured recesses (e.g., in the form of grooves) which weaken the respective parts of the seal and facilitate its deformation in response to flexing of the prongs by the deforming surface as a result of threading of the two components into each other. This ensures the establishment of reliable sealing engagement between the internal surface of the seal and the outer surface of an article (e.g., a tube, a cable or a hose) which extends through the passage of the one component. The internal and/or the external surface of the seal can be provided with a plurality of recesses (e.g., criss-crossing circumferential and axially parallel recesses) which define substantially trapeziform profiles at the respective surface of the seal.

The aforementioned reinforced second axial end of the seal can constitute a slotted rim which can extend into recesses in the end faces of the prongs and/or into recesses in the internal surfaces of the prongs. Such rim can constitute one of several reinforcing portions which are provided on predetermined parts of the seal to ensure predictable deformation of the seal into engagement with the outer surface of an article. As already mentioned above, the prongs can be provided with complementary recesses for some or all of the reinforcing portions on the seal.

The external faces of the first portions of the at least some prongs can be configured to slide along the deforming surface during radially inward movement of the end faces of the prongs. The external faces of the first portions of the at least some prongs can be stepped, the same as the radially outer portion and/or the radially inner portion of the deforming surface. The outer face of each first portion and/or the deforming surface can be provided with a plurality of steps, and the steps of the deforming surface can extend circumferentially of the one component. The external faces of the first portions can further include portions which constitute gradual transitions between the neighboring steps. The same applies for the deforming surface. The transitions can constitute substantially conical transitions.

If the first portions of the at least some prongs extend radially outwardly of the clamping device beyond the respective second portions, each such first portion can include an undercut end portion adjacent the respective second portion.

The first portions of the at least some prongs can extend into the passage of the one component in response to threading of the two components into each other. This reduces the effective cross-sectional area of the passage so that even a small-diameter article can be properly sealed and clamped by an annular seal which is deformed by the inwardly bent prongs of the clamping device. The effective cross-sectional area of the passage can be reduced by half or even more.

Another feature of the invention resides in the provision of a fitting for engagement with outer surfaces of cables, tubes and analogous articles. The fitting comprises first and second tubular components each having a first end and a second end and these components respectively comprise complementary external and internal threads at their first ends. One of the components has a substantially ring-shaped internal deforming surface including a radially outer portion having a first inclination relative to the axis of the one component and a radially inner portion having a different second inclination relative to the axis of the one component. The fitting further comprises a tubular clamping device which is carried by the other component and comprises an annulus of substantially axially parallel flexible prongs and elongated slots alternating with the prongs. The prongs are engaged and flexed by the internal surface radially inwardly of the clamping device in response to threading of the components into each other.

The two portions of the internal deforming surface can constitute substantially frustoconical surfaces. The arrangement is preferably such that the radially outer portion makes a first angle with a plane which is normal to the axis of the clamping device and that the radially inner portion of the deforming surface makes with such axis a second angle greater than the first angle.

A further feature of the invention resides in the provision of a fitting for engagement with outer surfaces of cables, tubes and analogous articles. The fitting comprises first and second tubular components each having a first and a second end, and these components respectively comprise complementary external and internal threads at their first ends. One of the components has a substantially ring-shaped internal deforming surface and the fitting further comprises an annulus of substantially axially parallel flexible prongs and elongated slots alternating with the prongs. The prongs have external surfaces which are engageable by the internal deforming surface in response to threading of the first component into the second component to thereby flex the prongs substantially radially inwardly. The internal surface and/or the external surfaces are stepped. Each of these surfaces can have at least one step extending in the circumferential direction of the clamping device. Each of these surfaces can further comprise a stop acting in the axial direction of the components.

The novel features which are considered as characteristic of the invention are set forth in particular in the appended claims. The improved fitting itself, however, both as to its construction and the mode of assembling the same, together with additional features and advantages thereof, will be best understood upon perusal of the following detailed description of certain presently preferred specific embodiments when read with reference to the accompanying drawings.

BRIEF DESCRIPTION OF THE DRAWINGS

FIG. 13a is a fragmentary axial sectional view of a fully assembled fitting of the type shown in FIG. 12a;

FIG. 20f is a similar view of a seal constituting a modification of the seal which is shown in FIGS. 14 and 14a;

FIG. 20i is a similar view of a seal constituting a modification of the seal of FIGS. 19 and 19a;

DESCRIPTION OF PREFERRED EMBODIMENTS

Figure 1:
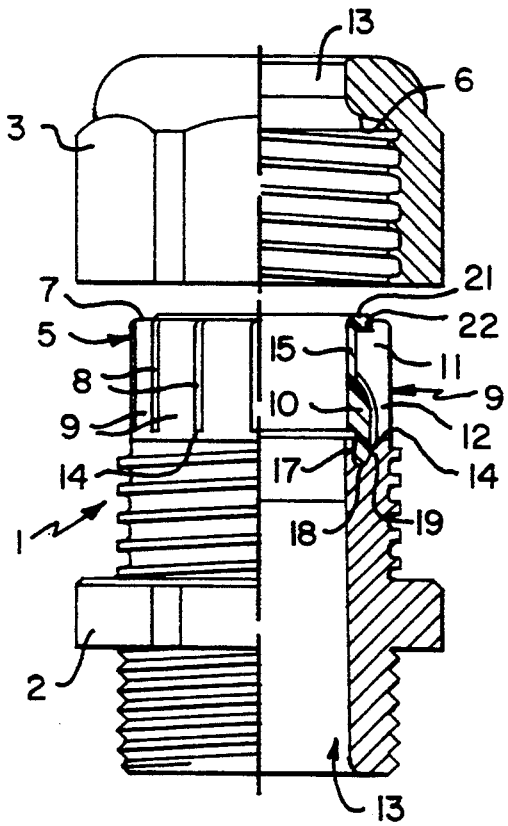
FIG. 1 is an exploded partly elevational and partly sectional view of a fitting which embodies one form of the invention and wherein the one component is a nut, the annular seal having a reinforcing rim extending into recesses provided in the end faces of the prongs forming part of the clamping device.
Figure 2:
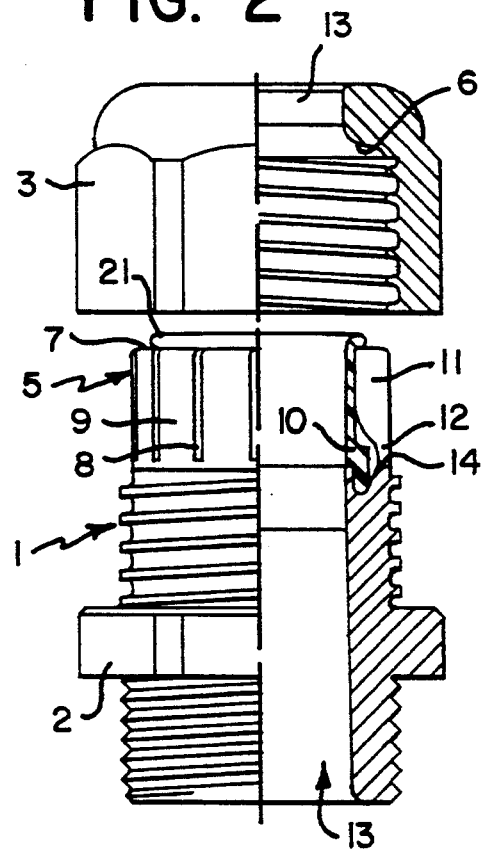
FIG. 2 is a similar exploded view showing a fitting wherein the reinforcing rim of the seal overlies the end faces of the prongs.

Referring first to FIGS. 1 to 39, the improved fitting 1 comprises four parts, namely a first tubular component 2 in the form of an elongated metallic or plastic sleeve having an external thread 2a, a second metallic or plastic tubular component 3 in the form of a nut having an internal thread 3a which can be brought into mesh with the external thread 2a, a tubular clamping device 5 with an annulus of deformable axially parallel prongs 9 alternating with elongated axially parallel slots 8, and a deformable annular seal 10 which can be installed within the annulus of prongs 9. The clamping device 5 which is shown in FIGS. 1 to 13d and 21 to 37e forms an integral part of the sleeve 2, and the clamping device 5 of FIGS. 38 and 39 constitutes a separately produced discrete part. Similar reference characters denote similar parts in all of the Figures.

The improved fitting 1 can be used to sealingly and clampingly engage elongated tubular or solid articles or objects 4, such as cables, hoses, pipes and the like. An article 4 is shown in each of FIGS. 8 to 11, 13a to 13d and 24 to 31.

Figure 8:
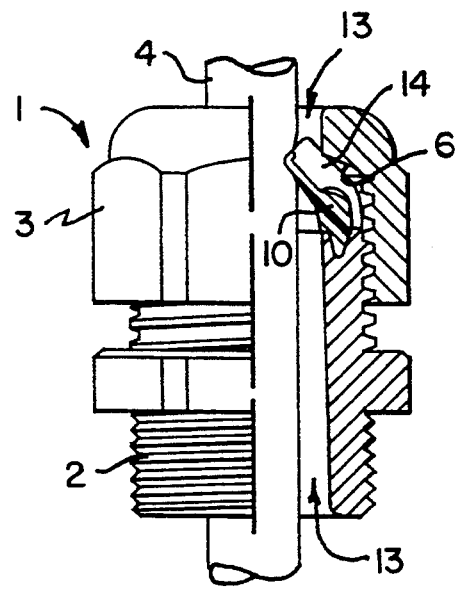
FIG. 8 is a partly elevational and partly axial sectional view of an assembled fitting wherein the outer surface of a cable or an analogous article is engaged by the seal as well as by the first portions of the prongs.

The first turn of the thread 3a is located at that (first) axial end of the nut 3 which surrounds the sleeve 2 when the components 2, 3 are threaded into each other, e.g., in a manner as shown in FIG. 8, and the first turn of the thread 2a is located at that (first) axial end of the sleeve 2 which is confined in the nut 3 when the latter is threaded onto the sleeve to deform the prongs 9 by moving their end faces 7 radially inwardly toward the axis of the clamping device 5 and to thereby urge the seal 10 into fluidtight engagement with the outer surface of the article 4. The nut 3 is further provided with a ring-shaped internal deforming surface 6 at one end of an axial passage 13 for an article 4. The surface 6 deforms the prongs 9 in response to threading of the sleeve 2 into the nut 3. When the threading of the sleeve 2 into the nut 3 is completed, the internal deforming surface 6 of the nut 3 can engage the adjacent end portion of the seal 10 and/or the adjacent portions of the prongs 9. The deforming surface 6 can constitute a conical, concave or convex surface, or it may include several portions which are disposed at different radial distances from the axis of the nut 3 and can have different inclinations and/or configurations, all as will be described hereinafter. The exact configuration of the deforming surface 6 will depend on a number of parameters, such as the configuration of the adjacent portions of the prongs 9, the desired extent of deformation of the seal 10 into engagement with the outer surface of the article 4 extending through the passage 13, and the diameter of the article which is to be engaged by the prongs 9 and/or seal 10. The seal 10 can be omitted if the improved fitting 1 is to be used primarily to clamp an article 4 in a selected axial position, e.g., to connect thereto a tube having an internal thread in mesh with the second external thread 2b of the sleeve 2, or if the prongs 9 can establish by themselves an adequate sealing connection between the sleeve 2 and clamping device 5 on the one hand, and the article 4 on the other hand.

FIGS. 1 to 7, 12a to 12d, 21 to 27 and 32 to 39 show the prongs 9 of the clamping device 5 in undeformed condition. The prongs 9 which are shown in FIGS. 8 to 11, 13a to 13d and 24 to 31 have undergone deformation lander the action of the deforming surface 6 to thereby directly engage the outer surface of an article 4 and/or to deform the seal 10 into requisite sealing engagement with such outer surface. The deformation of prongs 9 is most pronounced in the regions of their end faces 7 (i.e., at a maximum distance from the closed ends 14 of the adjacent slots 8) and is less pronounced or nil at a maximum distance from the open ends of the slots 8, i.e., in the regions of the closed ends 14.

In accordance with a feature of the invention, each prong 9 comprises at least one first portion 11 of greater thickness (as measured in the radial direction of the clamping device 5) and at least one second portion 12 of lesser thickness (again as measured in the radial direction of the clamping device). For the sake of simplicity, each of the illustrated prongs 9 comprises a single first portion 11 which is adjacent the respective end face 7, and a single second portion 12 which is adjacent the closed ends 14 of the neighboring slots 8. Thus, each second portion 12 is disposed between the respective first portion 11 and the adjacent (first) end of the sleeve 2. The length of a first portion 11 can greatly or slightly exceed, approximate or match the length of the respective second portion 12. It is equally possible to configurate the prongs 9 in such a way that the length of the second portions 12 at least slightly (or even greatly) exceeds the length of the respective first portions 11. The selection of the length of the first portions 11 relative to the length of the second portions 12 depends on a number of factors, such as the configuration of the deforming surface 6 in the nut 3, the desired extent of deformation of the seal 10, and the desired extent of clamping engagement between the outer surface of an article 4 on the one hand, and the prongs 9 and/or the seal 10 on the other hand.

Figure 3:
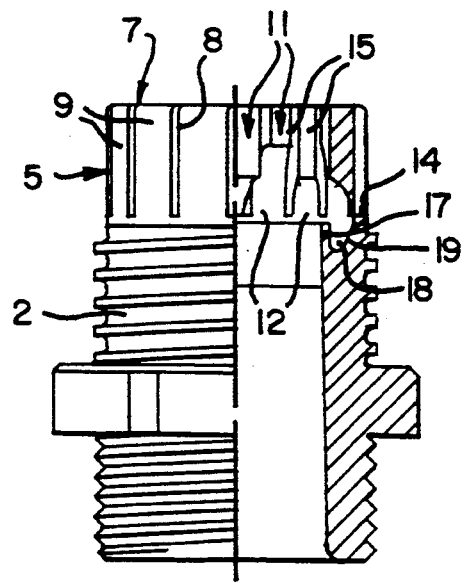
FIG. 3 is a partly elevational and partly axial sectional view of a modified other component wherein the prongs of the clamping device include shorter and longer first portions.
Figure 4:
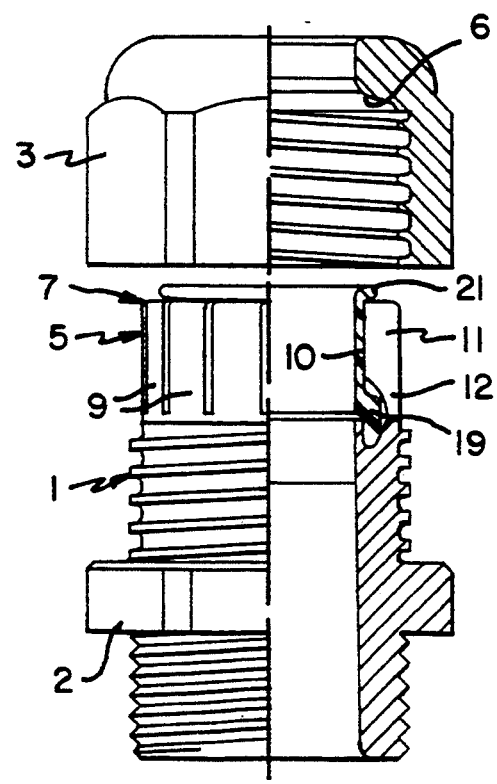
FIG. 4 is an exploded partly elevational and partly axial sectional view of a fitting which constitutes a modification of the fitting of FIG. 2.
Figure 5:
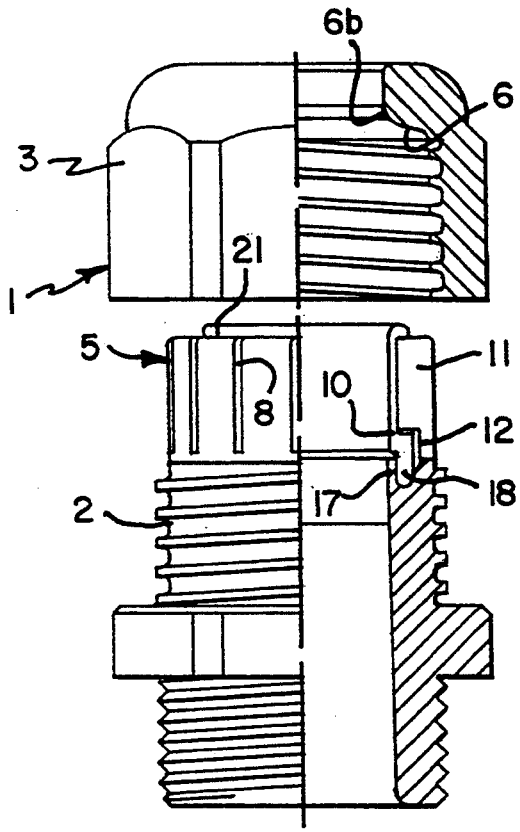
FIG. 5 is an exploded partly elevational and partly axial sectional view of a fitting wherein the nut is provided with a different deforming surface.

FIGS. 2, 4 to 7, 21 to 29 and 32 to 39 show relatively long first portions 11 and relatively short second portions 12. FIG. 3 shows that certain prongs 9 comprise relatively long first portions 11 and relatively short second portions 12, whereas the remaining prongs 9 include relatively short first portions 11 and longer second portions 12. FIGS. 8 to 13d, 30 and 31 show prongs 9 with relatively long second portions 12 and shorter or relatively short first portions 11. As can be seen in FIGS. 12a to 13d, the length of a first portion 11 can be less than one-half or even less than one-third of the length of the respective prong 9 (all as measured in the axial direction of the clamping device 5 and sleeve 2).

The thickness of the first portions 11 in the radial direction of the respective clamping devices 5 preferably equals or exceeds 60 percent (approximately two-thirds) of the difference between the root diameter of the internal thread 3a and the diameter of the passage 13 in the nut 3. The diameter of the passage 13 equals or approximates the diameter of the outer surface of the thickest (maximum-diameter) article 4 which can be caused to pass through the aligned axial passages of the component 2 and 3 of the improved fitting 1. Thus, the width of the ring-shaped clearance which remains between the outer surface of an article 4 and the internal surfaces 15 of the prongs 9 for insertion of an annular seal 10 is relatively small. This ensures the establishment of a reliable clamping and sealing action between the outer surface of the article 4 on the one hand, and the prongs 9 and/or seal 10 on the other hand.

The thickness of the first portions 11 can at least approximate or even exceed 75 percent of the difference between the root diameter of the thread 3a and the diameter of the passage 13. In fact, the thickness of the first portions 11 can equal the just discussed difference. This ensures that the fitting 1 can properly engage and sealingly clamp an article 4 having an outer surface with a diameter which is smaller or much smaller than the diameter of the passage 13 (see FIGS. 8 to 11 and 13a to 3d). Thus, the configuration of the prongs 9 can be such that each prong must undergo extensive deformation before the first portions 11 and/or the seal 10 can properly engage the outer surface of an article 4 having a relatively small diameter.

FIGS. 1 to 6 and 8 show that the width of each second portion 12 can decrease gradually in the axial direction of the clamping device 5, i.e., in a direction from the adjacent inner end of the respective first portion 11 toward the closed ends 14 of the adjacent slots 8. Such transition can take place along approximately one-half of the overall length of a second portion 12, and the internal face of the second portion 12 in the region of the transition can be flat (e.g., such internal surface can constitute a portion of a frustoconical surface), concave or convex. FIGS. 1 to 6 and 8 show that such gradual transition takes place along the internal surfaces 15 of the prongs 9 because the respective first portions 11 extend radially inwardly beyond the corresponding second portions 12. The just described configuration of the second portions 12 (with gradual transition into the respective first portions 11) is often desirable and advantageous because it ensures predictable deformation of the prongs 9 under certain circumstances (for example, depending on the shape and dimensions of the annular seal 10 and/or on the shape and dimensions of the deforming surface 6 and/or on the diameter of the outer surface of an article 4 which extends through the passage 13) and/or because this facilitates mass production of the combination of sleeve 2 and clamping device 5 in an injection molding or like machine if the combination is made of a plastic material.

As can be seen, for example, in FIGS. 1, 2 and 4 to 13d, a properly dimensioned and configured seal 10 can at least partially fill the annular clearance between the internal surfaces 15 of the prongs 9 and the outer surface of an article 4, even if the diameter of the outer surface of the article 4 extending through the aligned passages of the threadedly connected components 2 and 3 is less or much less than the diameter of the passage 13. This can be readily achieved by utilizing seals 10 of the type shown in FIGS. 14 to 20i. As already mentioned hereinbefore, the seal 10 constitutes an optional but highly desirable element of the improved fitting 1. If the accent is on the clamping action rather than on the sealing action, or if a reasonably satisfactory sealing action is acceptable, the seal 10 is omitted and the surface 6 is used to deform the prongs 9 into direct sealing and/or clamping engagement with the outer surface of an article 4.

As shown in FIGS. 10 and 13a to 13d, the axial length of the prongs 9 can be selected in such a way that their effective length, upon completed deformation by the surface 6 (i.e., in response to completed assembly of the fitting 1) suffices to ensure that the end faces 7 of the prongs 9 are at least close to the second end of the nut. Otherwise stated, the effective length of the prongs 9 in fully deformed condition can equal or approximate the distance of the first end of the sleeve 2 from the second end of the nut 3. The original length of the prongs 9 (in undeformed condition) is greater because their effective length decreases in response to progressing deformation by the surface 6 of the nut 3. The first portions 11 of the fully deformed prongs 9 shown in FIGS. 10 and 13a to 13d extend into the passage 13 so that their internal faces (forming part of the internal surfaces 15 of the respective prongs 9) are or can be in full engagement with the adjacent portions of the external surface of the seal 10 or directly with the outer surface of an article 4.

Figure 9:
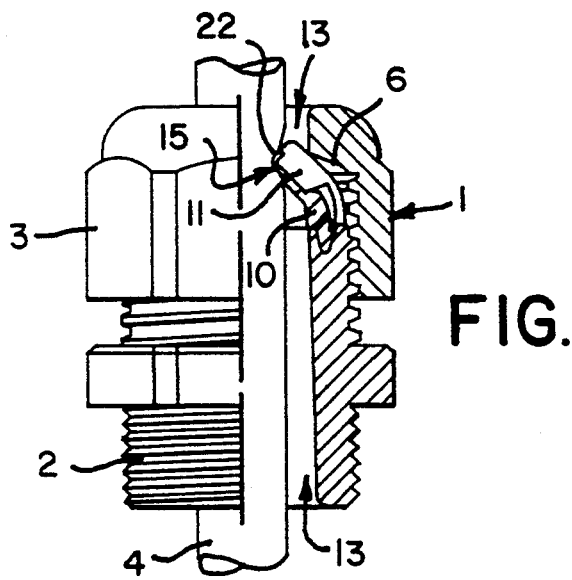
FIG. 9 is a similar view of an assembled fitting employing a modified clamping device and a modified seal.
Figure 11:
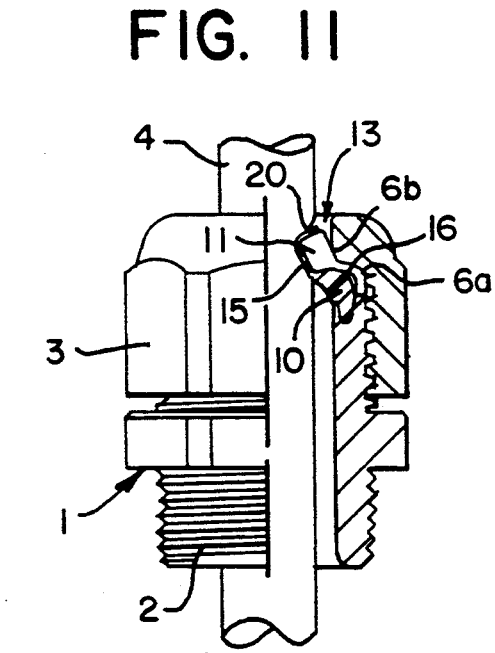
FIG. 11 is a similar view of a further assembled fitting employing a modified nut, a modified clamping device and a modified seal.

FIGS. 8, 9 and 11 show that the effective length of fully deformed prongs 9 can be less than the distance of the first end of the sleeve 2 from the second end of the nut 3, i.e., the first portions 11 of such prongs can extend into but not all the way to the exposed end of the passage 13. This also applies for the fittings or portions of fittings which are shown in FIGS. 1 to 7; when such fittings are fully assembled, the first portions 11 of the prongs 9 may extend into but not all the way to the exposed axial ends of the respective passages 13.

Figure 13A:
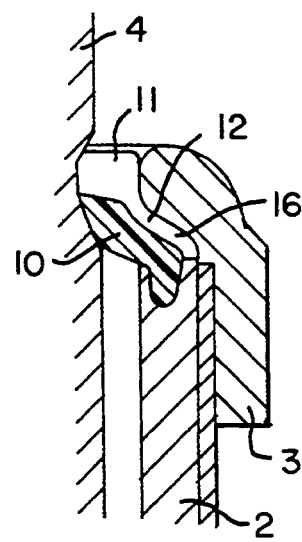

As can be seen, for example, in FIG. 13a, the length and the radial thickness of a second portion 12 can be selected in such a way that, when the respective prong 9 has undergone full deformation, a first part of the second portion (between the closed ends 14 of the adjacent slots 8 and a turning point 16) undergoes a first deformation, and a second part of the same second portion 12 (between the turning point 16 and the respective first portion 11) undergoes a different second deformation. This renders it possible to leave the orientation of the first portions 11 unchanged, i.e., the internal faces of the portions 11 remain parallel or nearly parallel to the axis of the clamping device 5 regardless of whether the prongs 9 are undeformed or have undergone a maximum degree of deformation. The first portions 11 and/or the adjacent portions of the seal 10 can deform the outer surface of an article 4, even if the diameter of such article is less or considerably less than the diameter of the passage 13, when the fitting 1 is fully assembled; this can be seen in each of FIGS. 10 and 13a to 13d.

Figure 10:
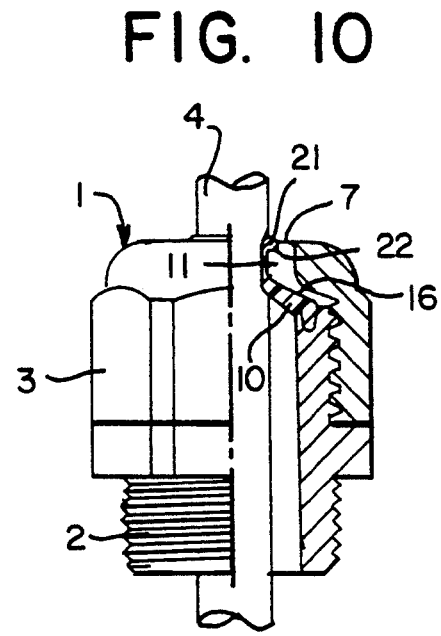
FIG. 10 is a similar view of another assembled fitting wherein the first portions of the prongs extend into the passage of the nut when the prongs are deformed to maintain the seal in engagement with the outer surface of an article.
Figure 13B:
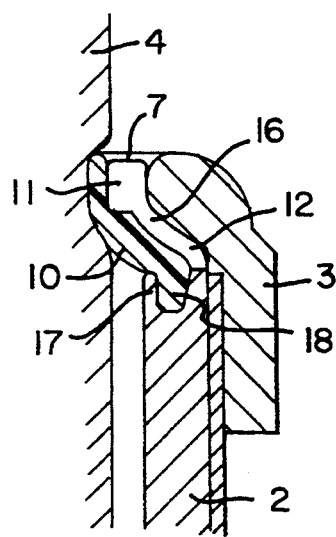
FIG. 13b is a fragmentary axial sectional view of a fully assembled fitting of the type shown in FIG. 12b.
Figure 13C:
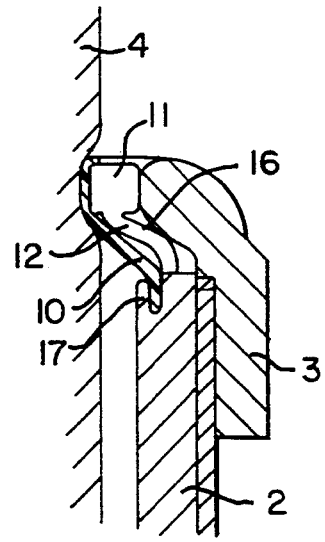
FIG. 13c is a similar view of a fully assembled fitting of the type shown in FIG. 12c.
Figure 13D:
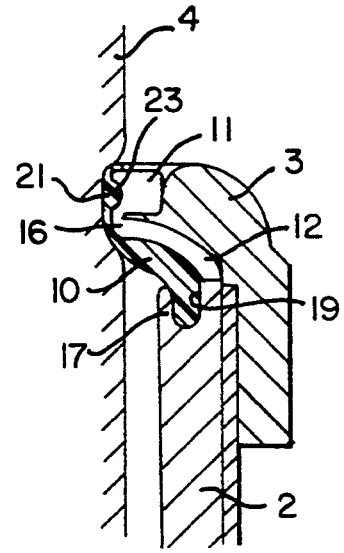
FIG. 13d is a similar view of a fully assembled fitting of the type shown in FIG. 12d.

The first part of the second portion 12 which is shown in FIG. 13d curves gradually toward the axis of the clamping device 5, and the internal face of such first part is a concave face. The internal face of the second part of the second portion 12 is a convex face which merges gradually into the concave face of the first part. This imparts to the deformed second portion 12 a substantially S-shaped or Z-shaped outline. The same applies, at least to an extent, for the deformed second portions 12 which are shown in FIGS. 13b and 13c as well as for the second portion 12 which is illustrated in FIG. 10.

FIG. 13d shows that the turning point 16 can be located in close or immediate proximity to the respective first portion 11, i.e., the second portion 12 can include a relatively long first part which is integral with the sleeve 2 and a relatively short or very short second part which is integral with the respective first portion 11. The transition between the two parts of the second portion 12 which is shown in FIG. 13d is not as gradual as the transitions shown in FIGS. 13a to 13c.

As can be seen in FIGS. 12a, 12b, 13a and 13b, the relatively short first portions 11 extend only radially inwardly of the respective second portions 12, i.e., the internal faces of the portions 11 are disposed radially inwardly of the internal faces of the respective second portions 12. In the embodiment of FIGS. 12c and 13c, the first portion 11 of each prong 9 extends radially inwardly as well as radially outwardly beyond the respective second portion 12; this ensures that the seal 10 does not contact or need not contact the second portions 12 in deformed or undeformed condition of the prongs 9. FIGS. 12d and 13d show that the first portion 11 of the prong 9 which is shown therein extends only radially outwardly of and beyond the respective second portion 12. The prongs 9 which are shown in FIGS. 12c, 12d, 13c and 13d ensure that the turning points 16 are much closer to the first portions 11 than to the closed ends 14 of the adjacent slots 8.

All of the aforedescribed modifications of the prongs 9 exhibit advantages for certain applications of the improved fitting 1. Thus, the clamping action of the device 5 and the sealing action of the seal 10 can be selected practically at will in dependency on various parameters (such as the diameters) of the articles 4 which are caused to extend through the passage 13 of the nut 3 and through the aligned passage 2c of the sleeve 2 when the assembly of the fitting 1 is completed in that the sleeve is threaded into the nut and the surface 6 deforms the prongs 9 in a direction toward the axis of the clamping device 5.

The material and the dimensions of the prongs 9 are preferably selected in such a way that the first portions 11 of the prongs 9 are not deformed at all or undergo a relatively small amount of deformation. This ensures predictable transfer of deforming and sealing forces from the deforming surface 6 to the seal 10 and/or directly to the outer surface of an article 4. The clamping action should suffice to ensure that, when the components 2 and 3 are properly threaded into each other, these components cannot move longitudinally of the article 4 and/or vice versa (provided, of course, that such pronounced clamping action is desired or necessary). The locations of first portions 11 in fully assembled condition of the respective fittings 1 will also depend on the desired magnitude or intensity of the sealing and/or clamping action. For example, if the first portions 11 of deformed prongs 9 extend into the passage 13, the fitting 1 can be used with advantage to properly clamp and seal articles 4 having a relatively small diameter (refer again to FIGS. 10 and 13a to 13d). Under certain different circumstances, the first portions 11 of deformed prongs 9 will be in contact with the deforming surface 6 without extending, or without extending well, into the passage 13 (refer again to FIGS. 8, 9 and 11). This does not prevent the first portions 11 from properly deforming a seal 10 against, or from directly engaging the outer surface of, a small-diameter article 4 which extends through the passage 13 with a considerable amount of clearance.

The slots 8 between the prongs 9 of the clamping device 5 can extend substantially radially (i.e., in planes which cross each other in the axis of the device 5). Alternatively, at least some of these slots can be disposed in planes which are tangential to the periphery of an imaginary cylinder coaxial with the device 5 and having a diameter less than the diameter of the composite cylindrical surface formed by the internal surfaces 15 of the prongs 9 in undeformed condition of the prongs. FIG. 3 shows that the external surfaces of prongs 9 which alternate with radially extending slots 8 are wider than the internal surfaces 15.

The number of relatively long first portions 11 (FIG. 3) may but need not equal or approximate the number of relatively short first portions. FIG. 3 shows that the longer first portions 11 alternate with shorter first portions as seen in the circumferential direction of the clamping device 5. The clamping device 5 of FIG. 3 renders it possible to pinpoint certain portions of an article 4 for a more pronounced or less pronounced deformation and for more or less pronounced sealing engagement with the seal 10. For example, if the first portions 11 of deformed prongs 9 are relatively short, they can extend all the way into the passage 13 (FIG. 10) due to the substantially S-shaped or Z-shaped outline of the respective relatively long second portions 12. On the other hand, the relatively long first portions 11 of deformed prongs 9 will extend only in part into the passage 13 (FIGS. 8 and 9) due to less extensive deformation of the respective (relatively short) second portions 12.

FIG. 12d shows that the internal surfaces 15 of the prongs 9 can be provided with recesses 23 for a reinforcing rib 21 at the external surface of the seal 10. Various forms of external reinforcing ribs or analogous projections are shown in FIGS. 20d, 20e and 20g. The reinforcing rib 21 cooperates with the prongs 9 to establish a form-locking connection between the seal 10 and the clamping device 5 and to reduce the likelihood of unpredictable and unsatisfactory deformation of the seal in response to radially inward movement of the end faces 7 of prongs 9 under the action of the deforming surface 6. The form-locking connection at 21 and 23 in FIG. 12d further prevents premature start of deformation of the seal 10 during radially inward flexing of the prongs 9 in response to threading of the sleeve 2 into the nut 3.

FIGS. 7 to 10 show that the seal 10 can be provided with a reinforcing end portion or rim 21 at that axial end which is remote from the sleeve 2, and such rim can extend (at least in part) into complementary recesses 22 in the end faces 7 of the prongs 9. The recesses 22 can be provided in addition to or in lieu of the recesses 23 in the internal surfaces 15 of the prongs 9. The purpose of the recesses 22 is the same as that of the recesses 23, i.e., they ensure the establishment of a form-locking connection between the seal 10 and the clamping device 5 to prevent premature or unpredictable deformation of the seal in response to flexing of the prongs 9 under the action of the deforming surface 6. Seals 10 with rims 21 at their axial ends are shown in FIGS. 14–14a, 16–16a, 19–19a, 20a, 20d, 20e and 20g.

Figure 35:
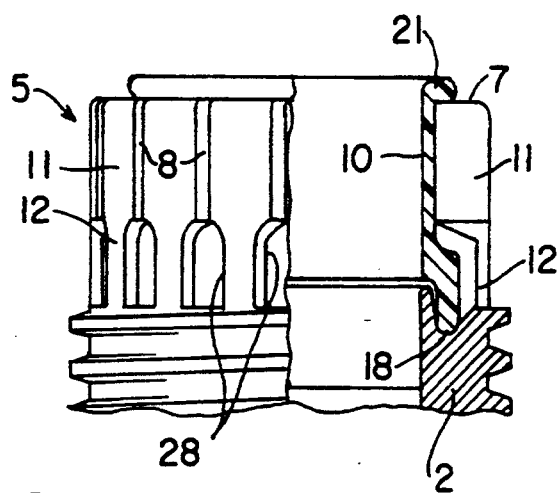
FIG. 35 is a partly elevational and partly axial sectional view of a portion of a fitting wherein the slots include wider portions between the second portions of the prongs.
Figure 36:
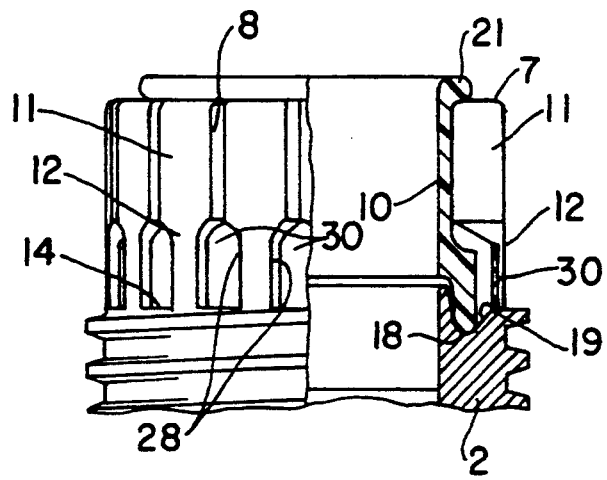
FIG. 36 shows the structure of FIG. 35 and membranes which extend across the slots in the region of the wider portions of the slots.

The number of prongs 9 can be as small as three, for example, if the prongs are configured in a manner as shown in FIGS. 35 and 36, i.e., with wide portions 28 of slots 8 disposed between the second portions 12 of the prongs. However, the number of prongs 9 can be much higher and can exceed, even greatly exceed, ten. The clamping devices 5 which are shown in FIGS. 1 to 7 and 35–36 can comprise as many as twelve or sixteen or even more prongs 9. The overall number of prongs 9 will depend on the dimensions of the fitting 1, on the diameter of the article 4 and on the desired sealing action between the outer surface of an article 4 in the passages 13, 2c and the seal 10.

The seal 10 can be more reliably maintained in an optimum position for predictable deformation under the action of radially inwardly flexed prongs 9 if its other axial end (the lower axial end as shown in FIGS. 1–2, 4—13d, 14a, 16a, 17a, 18a, 19a, 20a–20b, 20d–20i and 23–37e) is provided with a reinforcing portion or rim 10a which can be received in an annular socket 18 provided in the clamping device 5 and/or in the adjacent internal surface at the first end of the sleeve 2. This socket is bounded by a suitably configurated surface 19 and can surround a more or less pronounced ring-shaped skirt or barrier 17 of the device 5 or sleeve 2. The socket 18 ensures proper positioning of the seal 10, and more predictable and more satisfactory deformation of the seal 10 against the outer surface of an article 4, even if the prongs 9 (and hence also the seal 10) must undergo highly pronounced deformation, e.g., to the extent as shown in FIGS. 8 to 11. The Figures show numerous presently preferred configurations of the surface 19 and depths of the socket 18. A socket 18 can be configurated and dimensioned in such a way that it receives a portion of or the entire rim 10a of the seal 10 which is surrounded by the respective annulus of prongs 9. A socket 18 can be provided in the clamping device 5 regardless of whether or not this device is of one piece with the sleeve 2 or with another component of the improved fitting.

Mass production of the sleeve 2 and of the clamping device 5 which is of one piece with the sleeve can be simplified and rendered less expensive if the surface 19 bounding the socket 18 merges directly into the internal surfaces 15 of the prongs 9. Furthermore, this simplifies insertion of the rim 10a of a seal 10 into the socket 18. Those portions of internal surfaces 15 of the prongs 9 which merge into the surface 19 actually steer the rim 10a of a seal 10 into the socket 18, and the rim 10a can extend all the way into the deepmost portion of the socket 18.

FIGS. 8 to 10 show that the passage 13 of the nut 3 can be surrounded by a substantially cylindrical internal surface 13a. However, it is equally possible to provide the nut 3 with a conical surface 13a (FIGS. 23-31) which tapers axially outwardly and away from the deforming surface 6. Still further, the surface 13a can constitute a conical surface which tapers in a direction toward the deforming surface 6 (see, for example, FIG. 11). It is equally possible to provide the nut 3 with an internal surface 13a which surrounds the passage 13 and one end of which merges, either gradually or with one or more pronounced circumferentially extending edges, into the radially inner portion of the deforming surface 6. This can be seen in FIGS. 12a-13d and 29-31. The external faces of the first portions 11 of prongs 9 can bear against the surface 13a, against the surface 6 or partly against the surface 13a and partly against the surface 6 when the prongs 9 are flexed by the nut 3 to maintain the seal 10 in requisite engagement with an article 4. Furthermore, by properly selecting the configuration of the surface 13a and/or 6, the manufacturer can ensure that a particular nut 3 can be utilized with advantage for optimal flexing of prongs 9 having relatively short, relatively long, relatively thin or relatively thick first portions 11.

FIGS. 10, 11 and 13a-13d show that the nut 3 need not engage only the external faces of the first portions 11 of radially inwardly flexed prongs 9 when the fitting 1 is fully assembled. Thus, the radially inner portion or the radially outer portion of the deforming surface 6 can at least partially abut the external faces of the second portions 12 of prongs 9 while the first portions 11 are engaged by the radially inner portion of the surface 6 and/or by the surface 13a surrounding the passage 13. Such engagement between the surface 6 and the external faces of the second portions 12 is likely to take place if the diameter of the outer surface of an article 4 is not much less than the diameter of the passage 13. At such time, the entire external surface of each prong 9 (i.e., all the way from the end face 7 to the closed ends 14 of the adjacent slots 8) is or can be engaged by the surface 6 and/or 13a of the nut 3 when the latter is driven home to deform the prongs 9 radially inwardly toward the axis of the clamped article 4. Such engagement between the clamping device 5 and the nut 3 contributes to more reliable flexing of the prongs 9 and more predictable deformation of the seal 10 in response to engagement with the outer surface of an article 4.

If the diameter of the outer surface of an article 4 is much smaller than the diameter of the passage 13, the initial stage of threading of the sleeve 2 into the nut 3 is likely to entail a flexing of the prongs 9 under the action of the deforming surface 6 but without any pronounced resistance to radially inward movement of end faces 7 of the prongs. Thus, at such time the surface 6 must flex the prongs 9 solely or practically exclusively by overcoming the rather weak resistance of more readily flexible second portions 12 of the prongs 9. The resistance to further flexing of the prongs 9 increases considerably when the seal 10 and/or the internal faces of the first portions 11 reach the outer surface of the article 4. This can be accounted for by appropriate shaping of the deforming surface 6. As shown, for example, in FIGS. 12d and 13d, the surface 6 can include a radially outer annular portion 6a which can constitute a frustoconical surface and has a first inclination to the axis of the clamping device 5. Such surface 6 further includes a frustoconical radially inner second portion 6b whose inclination relative to the axis of the clamping device 5 is different from that of the radially outer portion 6a. As can be seen in FIGS. 12d and 13d, the inclination of the radially outer portion 6a of the deforming surface 6 relative to a plane which is normal to the axis of the clamping device 5 is less than the inclination of the radially inner portion 6b. In other words, the deforming surface 6 can change the orientation of the first portions 11 of the prongs 9 during radially inward flexing of the prongs as a result of progressing penetration of the sleeve 2 into the nut 3. The radially outer portion 6a of the surface 6 ensures rather quick inward flexing of the prongs 9 (as a result of sliding movement of outer faces of the first portions 11 along the portion 6a) in response to rather small axial displacement of the nut 3 and sleeve 2 relative to each other. The inward flexing of the prongs 9 is more gradual during advancement of the external faces of first portions 11 of prongs 9 along the radially inner portion 6b of the deforming surface 6. This reduces the likelihood of unpredictable deformation of the seal 10 during that stage of threading of the sleeve 2 into the nut 3 when the seal 10 and/or the first portions 11 of the prongs 9 actually engage the outer surface of an article 4 in the passage 13. The just discussed configuration of the deforming surface 6 further ensures that rotation of the nut 3 and sleeve 2 relative to each other, while the article 4 is already engaged by the seal 10 and/or by the first portions 11, necessitates the application of lesser torque than if the inclination of the radially inner portion 6b were the same as that of the radially outer portion 6a. Still further, such configuration of the deforming surface 6 renders it possible to reduce the axial length of the fitting 1 because a relatively short axial movement of the components 2 and 3 relative to each other suffices to ensure adequate flexing of the prongs 9 and reliable sealing engagement between the seal 10 and the outer surface of an article 4 in the passage 13. The provision of a deforming surface 6 with mutually inclined radially inner and radially outer portions 6b, 6a is particularly advantageous when the fitting 1 is to be used to clampingly and sealingly engage an article 4 having a diameter which is much smaller than that of the passage 13; such engagement can be achieved in response to the application of relatively small torque and as a result of relatively short axial movement of the components 2, 3 relative to each other.

The width of the radially outer portion 6a of the deforming surface 6 (as measured in the radial direction of the clamping device 5) can be less than the width of the radially inner portion 6b. For example, the width of the radially outer portion 6a can equal or approximate half the width of the radially inner portion 6b. However, it is equally possible, for use of the nut 3 in certain types of fittings, to configurate the deforming surface 6 in such a way that the width of the radially outer portion 6a exceeds (e.g., it can be twice) the width of the radially inner portion 6b.

FIGS. 12d and 13d show a pronounced transition between the radially inner and radially outer portions 6b and 6a of the deforming surface 6. FIGS. 12a-12c and 13a-13c show that such transition can be gradual, i.e., the surface 6 can further include an intermediate portion with a gradual (e.g., conical or convex) transition between the portions 6a and 6b. If the portions 6a and 6b constitute portions of spherical surfaces, the intermediate portion can also constitute a portion of a spherical surface with gradual transition from the radius of curvature of the portion 6a to the radius of curvature of the portion 6b. This ensures that the magnitude of torque which is required to rotate the components 2, 3 relative to each other increases gradually while the prongs 9 track the radially outer portion 6a, thereupon the intermediate portion and ultimately the radially inner portion 6b of the deforming surface 6.

If the diameter of an article 4 which is to be clamped by the prongs 9 and/or by the seal 10 is rather large, e.g., close to the diameter of the passage 13, the radially inner portion 6b of the deforming surface 6 might not be put to use at all, i.e., the application of the seal 10 and/or first portions 11 of the prongs 9 against the outer surface of a large-diameter article 4 can be completed before the first portions 11 begin to penetrate into the passage 13. The deformed seal 10 and the flexed prongs 9 promote the development of a self-locking action between the mating threads 2a and 3a, even if the diameter of an article 4 is such that adequate clamping action is reached in response to relatively small radially inward flexing of the prongs 9.

In a large majority of illustrated embodiments of the improved fitting, the external surfaces of the prongs 9 (in undeformed condition of the clamping device 5) are flush with the adjacent portions of the first end of the sleeve 2. In other words, the diameter of a cylindrical surface which is formed by the external surface of undeformed prongs 9 matches or approximates the outer diameter of the first end of the sleeve 2 and the root diameter of the external thread 2a or internal thread 3a. Reference may be had, for example, to FIGS. 12a and 12b.

FIGS. 12c and 12d show modified prongs 9 wherein the external faces of the first portions 11 jointly form a cylindrical surface having a diameter which matches or approximates the root diameter of the thread 2a or 3a but the external faces of the radially inwardly offset second portions 12 form a cylindrical surface with a diameter less than the root diameter. Such weakening and radially inward shifting of the second portions 12 enhances their flexibility and enables them to assume the substantially S-shaped or Z-shaped outlines which are shown in FIGS. 13c and 13d. In the embodiment of FIGS. 12c and 13c, the first portions 11 of the prongs 9 extend radially outwardly as well as radially inwardly of the respective second portions 12. This ensures that the seal 10 need not contact the internal faces of the second portions 12 regardless of the extent of deformation of the respective prongs 9.

Pronounced flexibility of the second portions 12 of prongs 9 (such as that of the second portions 12 shown in FIGS. 12c, 12d, 13c and 13d) is particularly desirable if the seal 10 extends all the way to or even beyond the end faces 7 of the prongs 9 and is to be urged by the internal faces of the first portions 11 to remain in pronounced sealing engagement with the outer surface of a workpiece 4 in the passage 13. Pronounced flexibility of the second portions 12 is often desirable and advantageous on the additional ground that such second portions can readily undergo radially inward flexing without causing expulsion of the rim 10a of the seal 10 from the socket 18 while the surface 6 is in the process of flexing the prongs 9 radially inwardly.

Figure 12A:
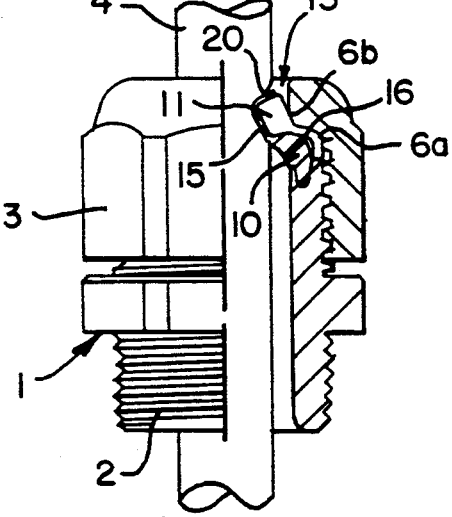
FIG. 12a is a fragmentary axial sectional view of a partly assembled fitting employing a seal which is surrounded only by the second portions of the prongs.
Figure 12B:
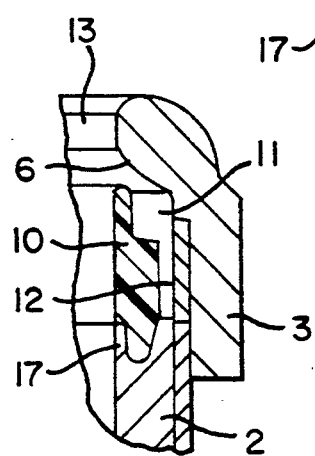
FIG. 12b is a similar view of another partly assembled fitting with a different seal and a different clamping device.
Figure 12C:
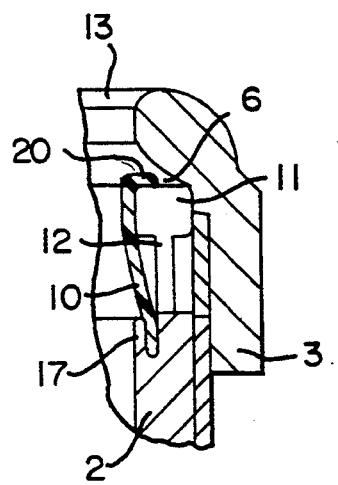
FIG. 12c is a similar view of a further partly assembled fitting with a different seal and a different clamping device.
Figure 12D:
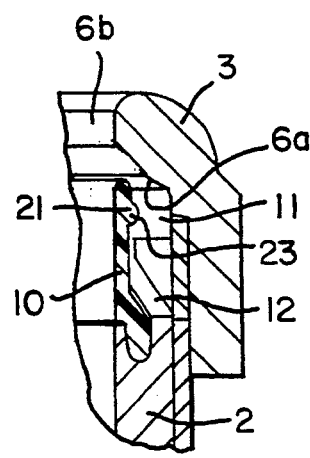
FIG. 12d is a similar view of still another partly assembled fitting with a different seal and a different sealing device.

FIGS. 12a and 13a show that the seal 10 need not extend axially beyond the second portions 12 of the prongs 9, i.e., that the first portions 11 can directly engage the outer surface of an article 4. FIGS. 12b and 13b show that the seal 10 can overlie the internal faces of the first portions 11 but that such seal need not overlie the end faces 7 (compare with FIGS. 12c, 12d, 13c and 13d). It is presently preferred to select the dimensions of the seal 10 in such a way that it overlies, at least in part, the internal faces of the first portions 11, not only in undeformed condition but also in deformed condition of the clamping device 5 and seal 10. In many instances, and as already described with reference to FIGS. 1, 2, 4, 5, 7-11, 12c-13c and 23-37e, the seal 10 preferably overlies portions of or the entire end faces 7 of the prongs 9. The deforming surface 6 can engage the rim 21 in the recesses 22 of the end faces 7 of the prongs 9 to ensure that the rim 21 remains in the recesses 22, i.e., that the seal 10 cannot slide relative to the first portions 11 and/or vice versa during flexing of the prongs 9 in response to threading of the sleeve 2 into the nut 3. FIG. 12c shows that the surface 6 is about to engage the rim 21 of the seal 10, i.e., such engagement can take place well ahead of completion of flexing of the prongs 9 and can be maintained at least during an extended stage of threading of the sleeve 2 into the nut 3. This ensures that the seal 10 undergoes highly predictable deformation in spite of a gradual reduction of the diameter of the rim 21 and movement of the end faces 7 radially inwardly toward the common axis of the nut 3 and sleeve 2. It has been found that such selection of the axial length of the seal 10 (that it overlies at least a portion of the end face 7 of each prong 9) greatly reduces the likelihood of pleating and/or rolling of the rim 21 of the seal into the interior of the device 5, i.e., toward and inwardly beyond the internal faces of the first portions 11.

Figure 15:
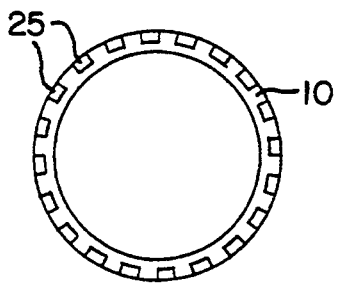
FIG. 15 is a plan view of a second seal.
Figure 15A:
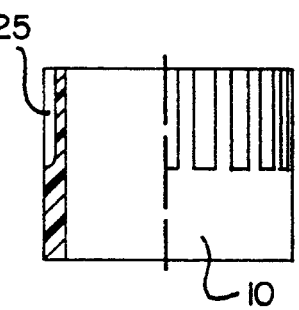
FIG. 15a is a partly elevational and partly axial sectional view of the seal of FIG. 15.

The seal 10 which is shown in FIGS. 12a and 12b includes portions of greater thickness and portions of lesser thickness. On the other hand, the seal 10 of FIGS. 12c and 13c resembles and can constitute a piece of hose having a constant diameter from end to end, at least in undeformed condition. With reference to FIG. 12b, the seal 10 which is shown therein includes a relatively thin portion which is adjacent the internal faces of first portions 11 of the prongs 9, a thicker second portion which is adjacent the internal faces of the second portions 12, and a third portion which fits snugly into the socket 18. On the other hand, the thickness of each portion of the seal 10 which is shown in FIG. 12c is the same but the thickness will normally vary to a certain extent (see FIG. 13c) in response to deformation of the seal, i.e., in response to inward flexing of the prongs 9 so that a certain length of the seal is biased against the outer surface of the article 4. FIGS. 15 and 15a show a sleeve-like seal 10 of substantially constant thickness from end to end; such seal can be utilized in the fitting of FIGS. 12c and 13c.

Referring again to FIGS. 12b and 13b, the seal 10 can extend beyond the end faces 7 of the prongs 9 but need not overlie such end faces. Thus, the upper end portion (as viewed in FIGS. 12b and 13b) of the seal 10 can project beyond the internal faces of first portions 11 of the prongs 9, at least while the seal is still in undeformed condition. Such dimensioning of the seal ensures that it can sealingly engage the outer surface of a relatively thin article 4 when the prongs 9 are flexed inwardly in response to threading of the sleeve 2 into the nut 3.

The reinforcing portions or rims 21 and/or 10a at the axial ends of the seal 10 serve two important functions. The rims 10a facilitate predictable insertion of a seal 10 into the clamping device 5 by entering the socket 18 at the closed ends 14 of the slots 8. The rims 21 reduce the likelihood of unpredictable deformation of the seal 10, especially when the diameter of an article 4 is much smaller than the diameter of the passage 13. The same holds true for the reinforcing portions 21 (FIGS. 12d and 13d) which are adjacent the internal faces of first portions 11 of the prongs 9. Reinforcing rims of the just outlined character are shown, for example, in FIGS. 1, 2, 4, 5, 7–11, 12d, 13d, 14–14a, 16–16a, 19–19a, 20a, 20d and 20g.

Experiments indicate that the rims 21 cooperate with the first portions 11 of the prongs 9 (regardless of whether they extend into the recesses 22 or 23) to prevent rolling of the seal 10 along the internal surfaces 15 of the prongs during flexing of the prongs under the action of the deforming surface 6 and before the seal comes in contact with the outer surface of an article 4. Rolling of the seal 10 before it contacts the article would affect the sealing action by reducing the effective axial length of the seal. This could result in less satisfactory sealing action or would entail total absence of sealing action.

Additional modes of ensuring predictable and satisfactory engagement between a seal 10 and an article 4 are illustrated in FIGS. 14 to 20i. The majority of these undertakings are intended to ensure predictable constriction of the seal 10 prior to coming into sealing engagement with the outer surface of an article 4. Thus, the seal can be provided with axially parallel and/or circumferentially extending recesses in the form of grooves or flutes 24, 25 which weaken selected portions of the seal to thus ensure predictable constriction in response to flexing of the prongs 9. Such grooves or flutes 24 and 25 can be provided in those portions of a seal 10 which are adjacent the internal faces of first portions 11 of the prongs 9, and they can be provided in the internal and/or in the external surface of the seal 10. The grooves or flutes 24, 25 provide room for reception of adjacent portions of the seal 10 during constriction so that the reduction of diameter during flexing of the prongs 9 by the surface 6 takes place in a predictable manner. Furthermore, such grooves reduce the likelihood of the development of pleats, folds and similar undesirable formations which could affect the predictability of movement of the seal 10 into optimal engagement with the outer surface of an article 4. The distribution of grooves or flutes may but need not be uniform.

Figure 14:
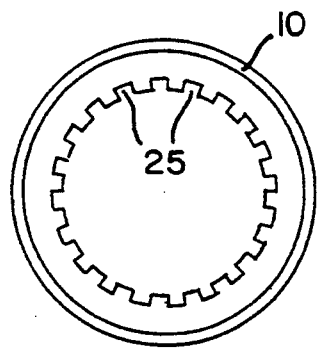
FIG. 14 is a plan view of one annular seal which can be utilized in the improved fitting.
Figure 14A:
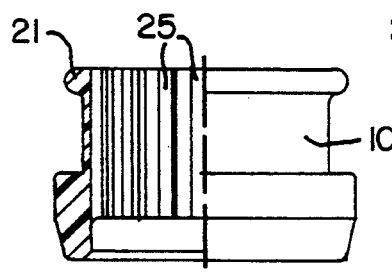
FIG. 14a is a partly elevational and partly axial sectional view of the seal which is shown in FIG. 14.

FIGS. 14 and 14a show a seal 10 with two circumferentially complete reinforcing rims 10a, 21 at the axial ends and with axially parallel internal recesses in the form of grooves or flutes 25 which are equidistant from each other as seen in the circumferential direction of the seal.

FIGS. 15 and 15a show a seal 10 which resembles a length of hose having a constant thickness from end to end. A portion of the external surface of this seal is provided with axially parallel recesses in the form of equidistant grooves or flutes 25 disposed in the region which is to be contacted by the internal faces of first portions 11 of the prongs 9.

Figure 16:
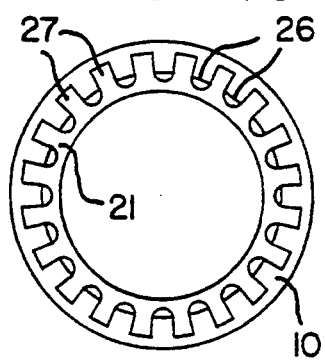
FIG. 16 is a plan view of a third seal.
Figure 16A:
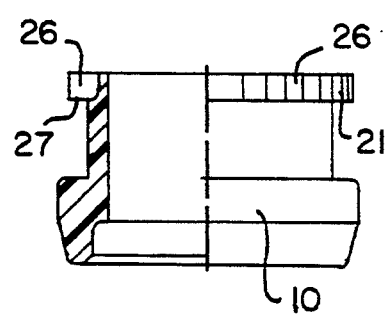
FIG. 16a is a partly elevational and partly axial sectional view of the seal of FIG. 16.

FIGS. 16 and 16a show a seal 10 which is similar to the seal of FIGS. 14–14a but with the internal flutes 25 omitted. Instead, the rim 21 is weakened by radially inwardly extending slots 26 with the attendant formation of an annulus of teeth 27 receivable in the recesses 22 of end faces 7 of the prongs 9 when the seal 10 of FIGS. 16–16a is put to use. This ensures predictable deformation of the rim 21.

Figure 17:
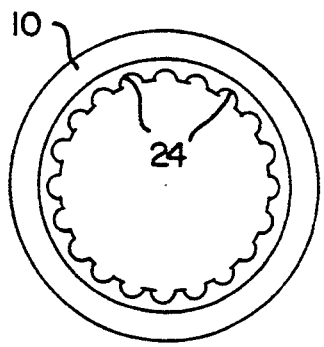
FIG. 17 is a plan view of a fourth seal.
Figure 17A:
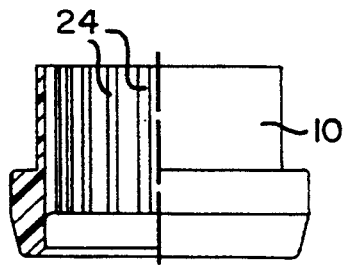
FIG. 17a is a partly elevational and partly axial sectional view of the seal of FIG. 17.

FIGS. 17 and 17a show a seal 10 which is similar to the seal of FIGS. 14 and 14a but with the rim 21 omitted. The cross sectional outlines of the grooves 25 which are shown in FIGS. 17 and 17a are different from those of the grooves 25 which are shown in FIGS. 14 and 14a.

Figure 18:
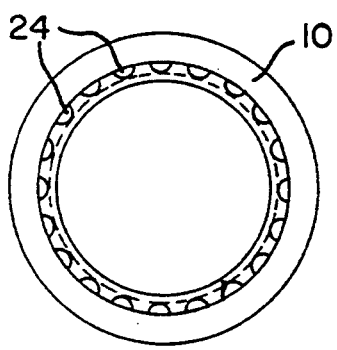
FIG. 18 is a plan view of a fifth seal.
Figure 18A:
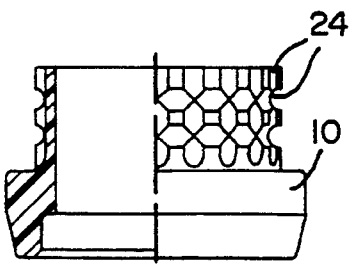
FIG. 18a is a partly elevational and partly axial sectional view of the seal of FIG. 18.

FIGS. 18 and 18a illustrate a seal 10 having an external surface provided with circumferentially extending and axially parallel recesses, grooves or flutes 24 and 25. These flutes cooperate to provide the external surface of the seal 10 with a pattern or array of substantially trapezoidal protuberances 10c.

Figure 19:
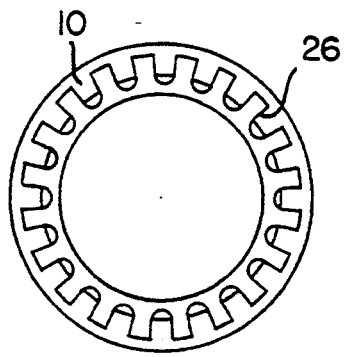
FIG. 19 is a plan view of a sixth seal.
Figure 19A:
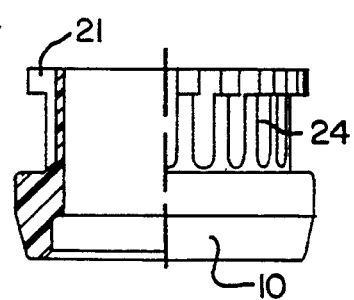
FIG. 19a is a partly elevational and partly axial sectional view of the seal of FIG. 19.

The seal 10 of FIGS. 19 and 19a combines the features of the seals which are shown in FIGS. 15–15a and 16–16a. Each slot 26 can merge into one of the axially parallel grooves 25.

Figure 20A:
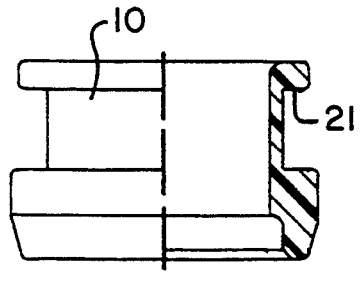
FIG. 20a is a partly elevational and partly axial sectional view of another seal.

The seal 10 of FIG. 20a resembles that of FIGS. 14–14a but with the grooves 25 omitted.

Figure 20B:
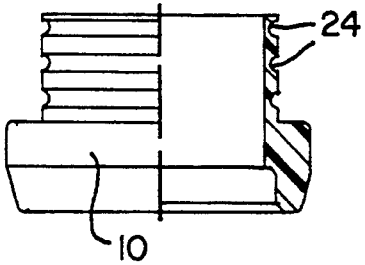
FIG. 20b is a similar view of a seal having an external surface provided with circumferentially complete reinforcing ribs.

The seal 10 of FIG. 20b has endless circumferentially extending recesses or grooves 24 which are provided in the external surface and are adjacent the internal surfaces 15 of the prongs 9 when the seal of FIG. 20b is inserted into a clamping device 5.

Figure 20C:
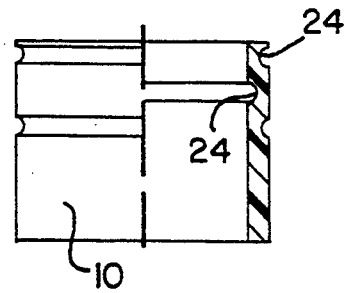
FIG. 20c is a similar view of a seal having an external surface provided with a helical groove.
Figure 20D:
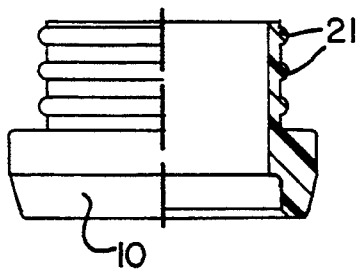
FIG. 20d is a similar view of a seal constituting a modification of the seal of FIG. 20b.
Figure 20E:
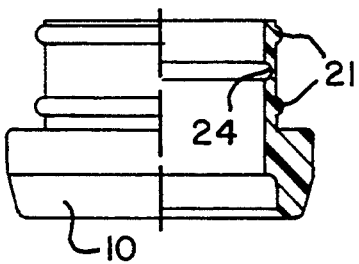
FIG. 20e is a similar view of a seal constituting a modification of the seal of FIG. 20c.

The seal 10 of FIG. 20c resembles the seal of FIGS. 15 and 15b except that each of its surfaces is provided with one or more endless circumferentially extending grooves or recesses 24 which weaken the portion to be engaged by the first portions 11 of the prongs 9. The number of recesses 24 in the external surface of the seal 10 need not match the number of such recesses in the internal surface.

FIG. 20d illustrates a seal 10 which is similar to that of FIG. 20b except that its external surface is provided with reinforcing portions or ribs 21 each of which constitutes a circumferentially complete ring. These rings are provided on that portion of the external surface of the seal 10 which is to be engaged by first portions 11 of the prongs 9.

FIG. 20e illustrates a modified seal 10 wherein circumferentially complete ring-shaped reinforcing portions or ribs 21 are provided on the external surface and at least one weakening recess or groove 24 is provided in the internal surface of that portion which is to be engaged by the first portions 11 of the prongs 9 when the seal of FIG. 20e is put to use. The recess 24 is ring-shaped and is disposed between the ribs 21 as seen in the axial direction of the seal 10.

Figure 20F:
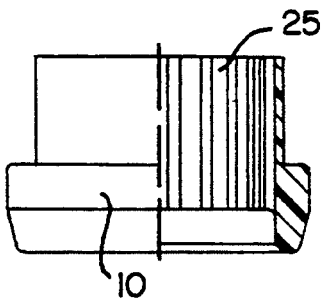
Figure 20G:
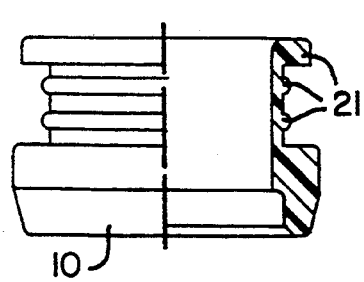
FIG. 20g is a similar view of a seal which constitutes a modification of the seal shown in FIG. 20d.

The seal 10 of FIG. 20f is similar to the seal of FIGS. 17–17a.

FIG. 20g shows a seal 10 which is similar to the seal of FIG. 20e except that one of the reinforcing ribs 21 is more pronounced to form a rim which can be received in the recesses 22 of the prongs 9.

Figure 20H:
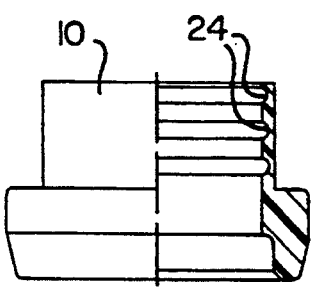
FIG. 20h is a similar view of a seal constituting a modification of the seal which is shown in FIG. 20e.

The seal 10 of FIG. 20h constitutes a modification of the seals which are shown in FIGS. 20c and 20e. Its internal surface is provided with three ring-shaped recesses or grooves 24.

Figure 20I:
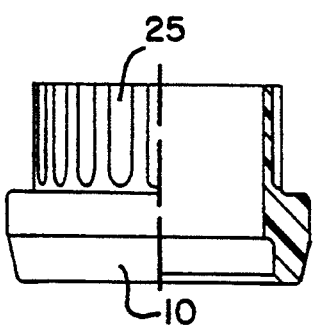

The seal 10 of FIG. 20i is similar to those which are shown in FIGS. 15–15a and 19–19a.

The purpose of reinforcing ribs or like projections on the seal 10 is to stiffen the corresponding parts of the seal so that they can more readily withstand the deforming action of an article 4 and of the prongs 9 during threading of the sleeve 2 into the nut 3. The seals 10 of FIGS. 20d, 20e and 20g can be utilized with particular advantage in clamping devices 5 of the type shown in FIGS. 12d and 13d in that their circumferentially extending ribs 21 can enter the recesses 23 in the internal faces of first portions 11 of the prongs 9 to reduce the likelihood of rolling and/or other undesirable movements or deformations of the seal during clamping against the outer surface of an article 4, especially an article whose diameter is considerably smaller than that of the passage 13. It has been found that proper distribution of reinforcing and/or weakening portions at the external and/or internal surface of a seal renders it possible to achieve surprisingly large reductions of the diameter of a portion of the seal 10 (adjacent the internal surfaces 15 of the prongs 9) so as to thus enhance the versatility of the improved fitting 1. Thus, the fitting can be utilized with advantage to sealingly engage and clamp articles 4 having a relatively large diameter (e.g., a diameter approaching that of the passage 13) or a diameter which is smaller or much smaller than that of the passage 13. Moreover, the sealing action is uniform all the way around the outer surface of an article 4. This is attributed to the afore-discussed reduction of likelihood of rolling, curling, pleating and/or other undesirable deformations of the seal 10 during a reduction of its diameter due to inward flexing of the prongs 9.

Figure 21:
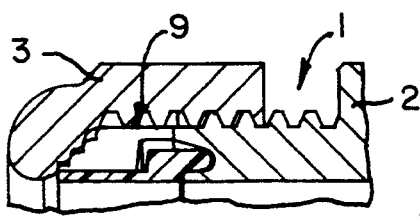
FIG. 21 is a fragmentary axial sectional view of a partly assembled fitting wherein the deforming surface is stepped and the prongs have stepped external surfaces.
Figure 22:
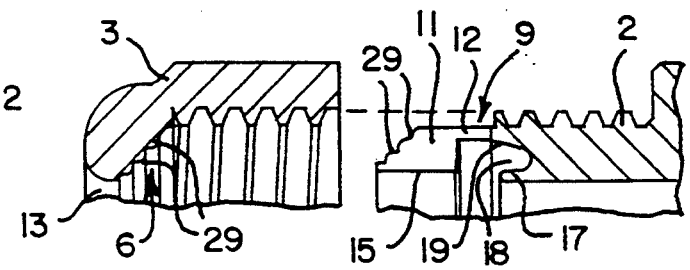
FIG. 22 is an exploded view of the structure which is shown in FIG. 21.

FIGS. 21 and 22 illustrate a portion of a modified fitting 1 which is designed to ensure more predictable radially inward movements of the first portions 11 of prongs 9 during engagement by the substantially conical deforming surface 6 of the nut 3. The external faces of the first portions 11 are stepped at 29, and the surface 6 of the nut 3 is stepped at 29a. The steps 29 of the first portions 11 can be identical or similar, their surfaces can make a right angle or an acute angle, and the edges of the steps 29 are or can be rounded (as shown in FIG. 22). Analogously, the steps 29a (which are circumferentially complete rings) can be provided with surfaces or facets which make a right angle or an acute angle, and the edges of the steps 29a can be rounded (as shown in FIG. 22) in order to facilitate the advancement of the stepped external faces of the first portions 11 along the stepped deforming surface 6.

When the sleeve 2 is being threaded into the nut 3 of FIGS. 21 and 22, the prongs 9 advance along the internal surface 6 in stepwise fashion and the orientation of the first portions 11 remains at least substantially unchanged. In other words, the inclination of internal faces of the first portions 11 relative to the axis of an article in the passage 13 of the nut 3 changes little or does not change at all. The thinner second portions 12 of the prongs 9 undergo deformation which is required in order to enable the first portions 11 to advance radially inwardly toward the common axis of the components 2 and 3. The feature that the orientation of the first portions 11 does not change at all or changes only slightly is particularly desirable when the diameter of an article 4 is considerably less than the diameter of the passage 13, i.e., when the prongs 9 must be subjected to a pronounced flexing action before the internal faces of the first portions 11 reach the outer surface of a small-diameter article.

The rounded transitions between the steps 29 and/or 29a can be replaced with conical transitions without departing from the spirit of the invention. Such steps ensure repeated centering of the annulus of prongs 9 relative to the deforming surface 6 during flexing of the prongs toward the outer surface of an article 4. The second portions 12 of the prongs 9 are sufficiently flexible to ensure that the orientation of the first portions 11 does not change during movement toward the outer surface of an article 4 regardless of the diameter of such article. This enhances the versatility of the fitting embodying the structure of FIGS. 21 and 22.

The axially extending surfaces of steps 29 at the external faces of the first portions abut the axially extending surfaces of successive steps 29a of the deforming surface 6 during penetration of the sleeve 2 into the nut 3. The radially extending surfaces of the steps 29 and 29a come into abutment with each other to repeatedly center the annulus of prongs 9 during radially inward flexing of the prongs toward the outer surface of an article 4.

The feature which is shown in FIGS. 21 and 22 can be utilized with equal or similar advantage in fittings wherein the prongs do not include first portions of greater thickness and second portions of lesser thickness. Thus, the steps 29 and/or 29a can be provided in a fitting wherein the thickness of the prongs is constant from their end faces all the way to the closed ends of the adjacent slots. Furthermore, such feature can be utilized regardless of whether the clamping device 5 is a separately produced part or is of one piece with the sleeve 2 or with an equivalent of such sleeve.

It has been found that a single step 29 and/or 29a suffices to enhance the centering action of the deforming surface 6. As a rule, the external faces of the first portions 11 will be provided with at least two steps 29 and the surface 6 will be provided with two or more steps 29a. FIGS. 21 and 22 show that the illustrated first portion 11 is provided with three steps 29 and the surface 6 is also provided with more than two steps 29a. The external face of the first portion 11 is further provided with a stop adjacent one of the outer steps 29, and the surface 6 is also provided with a stop adjacent an outer step 29a. This increases the number of stepwise advances performed by a prong 9 during flexing toward the outer surface of an article 4 in the passage 13.

A fitting which embodies the structure of FIGS. 21 and 22 is preferably provided with relatively thin and readily flexible second portions 12 in order to ensure that such second portions can assume an outline (e.g., an S-shaped or Z-shaped outline) which guarantees that the orientation of the first portions 11 can remain substantially unchanged during inward flexing of the prongs 9.

The steps 29 and/or 29a can be small or very small and can have the same size or shape. The relationship of the diameters of steps 29a and of the diameters of composite ring-shaped steps formed by one step 29 of each of the prongs 9, can be selected in such a way that these diameters differ from each other in the same way as the diameters of a set of cables or other articles 4 which are to be clamped by the improved fitting.

The fitting of FIGS. 21 and 22 exhibits the additional advantage that, when the sleeve 2 is driven into the nut 3 and the prongs 9 are flexed to urge the seal 10 against the outer surface of an article (not shown in FIGS. 21 and 22), one step 29 of each prong 9 is received within one step 29a of the nut 3 so that the prongs as well as the adjacent portions of the nut 3 are only subjected to radial stresses. This is in contrast to the stresses which develop if the surface 6 is a conical surface; the forces acting toward the nut 3 then include axial and radial components.

The steps 29a in the nut 3 can extend all the way or at least close to the passage 13. This ensures that at least one of the steps 29a can be engaged by a step 29 of each prong 9 even if the diameter of an article in the passage 13 is very large. The height of steps 29a at or even in the passage 13 can equal or can be less than the height of steps 29 at the external faces of the first portions 11. Such design ensures that the prongs 9 need not undergo pronounced deformation before the steps 29 of their first portions 11 can engage the steps 29a of the nut 3.

Steps 29 and/or 29a which are bounded in part by conical surfaces (rather than by cylindrical surfaces) exhibit the advantage that the steps 29 and 29a can be moved into reliable force-locking engagement with each other.

As mentioned above, one step 29 and/or one step 29a can be provided for the nominal size or nominal diameter of each of an entire range of articles 4 which are to be clamped by a particular fitting 1. Steps which are bounded in part by cylindrical surfaces are preferred in many instances because they ensure that the nut 3 is subjected, either primarily or exclusively, to radially oriented forces, i.e., that the forces acting between the clamped article and the nut 3 do not have any components in the direction of the common axis of the sleeve 2 and nut 3 when the latter receives the sleeve and the clamping device 5.

Figure 23:
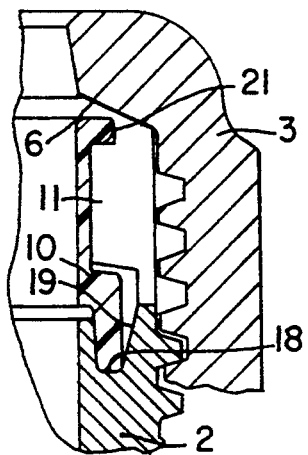
FIG. 23 is a fragmentary axial sectional view of another fitting which is shown in partly assembled condition.
Figure 24:
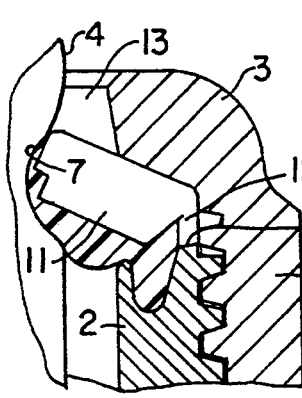
FIG. 24 shows the structure of FIG. 23 in fully assembled condition.

FIGS. 23 and 24 show a portion of a fitting wherein the prongs include relatively long first portions 11 and relatively short second portions 12. The deforming surface 6 is a conical surface and the surface 13a bounding the passage 13 is also a conical surface which tapers in a direction away from the surface 6. The first portions 11 extend beyond the internal faces of the relatively thin second portions 12 and their orientation changes appreciably during threading of the sleeve 2 into the nut 3 (compare FIGS. 23 and 24). The seal 10 is spaced apart from the internal faces of the second portions 12 prior to deformation of the seal but its deformation entails complete filling of the space in front of the internal faces of the second portions 12. This is desirable and advantageous because the deformed seal 10 is not subjected to pronounced tensional stresses in the axial direction of the sleeve 2. Flexing of the prongs 9 results in such changes of orientation of the first portions 11 that their external faces abut the deforming surface 6 all the way from the adjacent first turn of the thread 3a to the surface 13a. In addition, the first portions 11 extend radially inwardly beyond the surface 13a to engage the outer surface of an article 4 or to urge the adjacent portion of the seal 10 against such outer surface. The change of orientation of each first portion 11 (compare FIGS. 23 and 24) is achieved in response to a relatively short axial displacement of the sleeve 2 and nut 3 relative to each other. A comparison of FIGS. 23 and 24 shows that a small number of revolutions of the nut 3 relative to the sleeve 2 and/or vice versa suffices to achieve the pronounced change of orientation of first portions 11 so that the end faces 7 of the prongs 9 extend radially inwardly well beyond the surface 13a.

Figure 25:
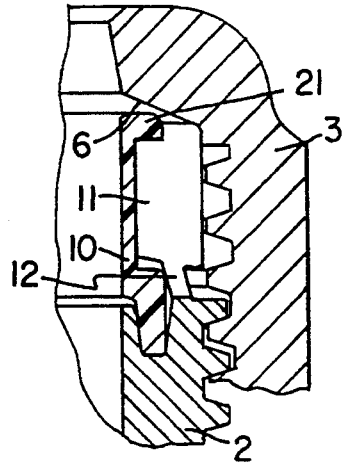
FIG. 25 is a view similar to that of FIG. 23 but showing another partly assembled fitting.
Figure 26:
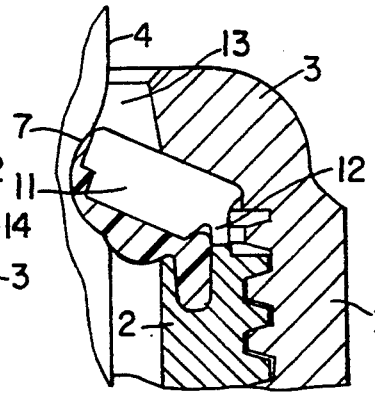
FIG. 26 shows the structure of FIG. 25 in assembled condition.

FIGS. 25 and 26 show a fitting constituting a rather slight modification of the fitting which is shown in FIGS. 23 and 24. The first portions 11 of the prongs extend radially inwardly and radially outwardly beyond the respective second portions 12. This, too, ensures that the external face of each first portion 11 engages the deforming surface 6 all the way from the nearest turn of the thread 3a to the surface 13a when the fitting is assembled (FIG. 26) so that the first portions 11 bear against the outer surface of an article 4 or urge the adjacent portions of the seal 10 into requisite engagement with such outer surface. The lower end of the external face of the first portion 11 shown in FIG. 25 is slightly undercut (at 11b) to ensure an increase of the area of contact with the surface 6 when the orientation of the first portion 11 is changed from that shown in FIG. 25 to that shown in FIG. 26.

Figure 27:
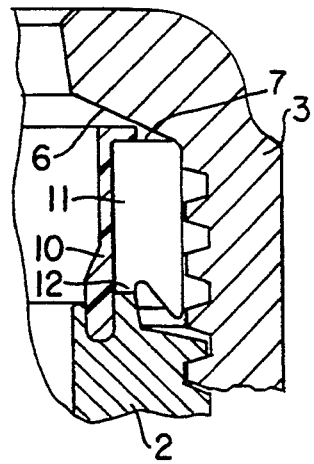
FIG. 27 is a fragmentary axial sectional view of another partly assembled fitting.
Figure 28:
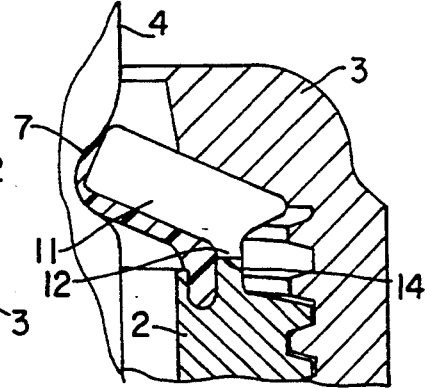
FIG. 28 shows the structure of FIG. 27 in assembled condition.

FIGS. 27 and 28 illustrate a fitting wherein the undercut at 11b is even more pronounced than in FIG. 25. The first portion 11 of the prong which is shown in FIGS. 27 and 28 projects only radially outwardly beyond the external face of the second portion 12. The undercut is so pronounced that the part 11b of the first portion 11 overlies the major part of the second portion 12 by extending almost all the way to the adjacent first end of the sleeve 2 prior to deformation of the prong. Such design also ensures that the first portion 11 of a deformed prong (FIG. 28) can overlie the adjacent portion of the surface 6 all the way from the radially outermost part of such surface to the surface 13a surrounding the passage 13.

Figure 29:
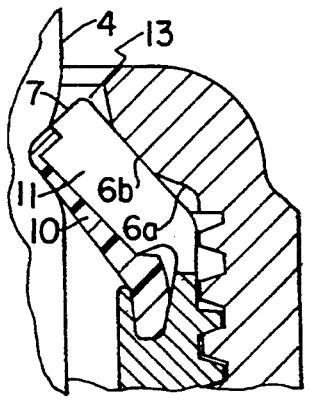
FIG. 29 is a fragmentary axial sectional view of an assembled fitting wherein the deforming surface of the nut has two mutually inclined conical portions and a conical intermediate portion.
Figure 30:
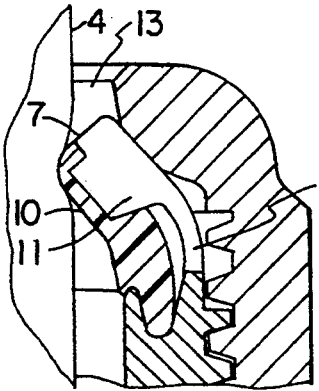
FIG. 30 is a similar view but showing a modified seal and a modified clamping device.
Figure 31:
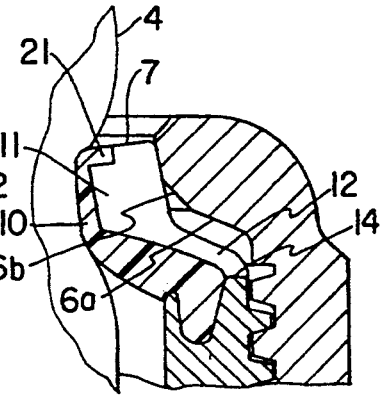
FIG. 31 is a similar view but showing a further seal and a further clamping device.

FIGS. 29, 30 and 31 illustrate three fittings wherein the deforming surface of the nut 3 includes a conical radially outer portion 6a and a conical radially inner portion 6b. Furthermore, when the prongs are flexed radially inwardly, their second portions 12 can actually abut the adjacent turns of the thread 3a in the nut 3 to ensure predictable guidance during flexing and adequate propping during engagement of the prongs and/or seal 10 with the outer surface of an article 4. The prong which is shown in FIG. 29 has a relatively long first portion 11 whose external face abuts the radially inner portion 6b of the deforming surface in deformed condition of the seal 10.

The first portion 11 of the prong which is shown in FIG. 30 is relatively short, i.e., the second portion 12 is relatively long. The diameter of the article 4 is relatively large so that the seal 10 engages the outer surface of such article as soon as the external face of the relatively short first portion 11 reaches the inner portion 6b of the deforming surface in the nut 3. The second portion 12 then assumes an arcuate shape and its external face abuts or can abut one or more turns of the thread 3a. FIG. 31 shows the same fitting during engagement of the seal 10 with the outer surface of an article 4 which can readily yield in response to pressure exerted by the short first portions 11. The illustrated first portion 11 has advanced beyond the radially inner portion 6b of the deforming surface and abuts the adjacent portion of surface 13a surrounding the passage in the nut 3. The deformed second portion 12 has a substantially S-shaped outline and its internal face is contacted by the seal 10 all the way from the first portion 11 to the locus where the portion 12 is of one piece with the adjacent first end of the sleeve 2.

FIGS. 30 and 31 clearly show that one and the same fitting can be used in connection with articles 4 having larger or smaller diameters as well as with articles which offer more or less pronounced resistance to deformation by the first portions 11 of the prongs 9. The maximum diameter of an article 4 cannot exceed the diameter of the passage 13 because the nut 3 must be slipped onto the article 4 or the article must be otherwise introduced into the passage 13. The clamping action of the device 5 is satisfactory regardless of the diameter of the article 4 which extends through the passage 13; all that is necessary is to drive the sleeve 2 deeper into the nut 3 if the diameter of the article 4 is relatively small.

The majority of articles 4 which are shown in the drawing have diameters at least slightly smaller than the diameter of the passage 13. This also applies for the articles which are shown in FIGS. 30 and 31. The diameters of the articles 4 can be smaller than illustrated; all that is necessary is to select the dimensions of the prongs 9 accordingly so that their first portions 11 and/or the respective portions of the seal 10 can reach and properly engage the outer surface of a small-diameter article not later than when the sleeve 2 has been fully threaded into the nut 3.

Figure 32:
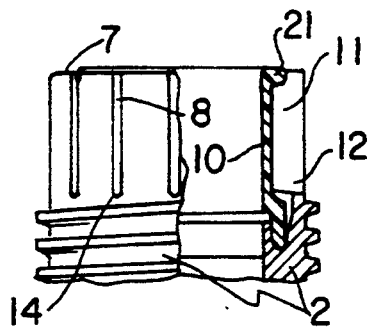
FIG. 32 is a partly elevational and partly axial sectional view of a clamping device-seal combination wherein the closed ends of the slots are spaced apart from the first turn of the external thread on the other component.
Figure 33:
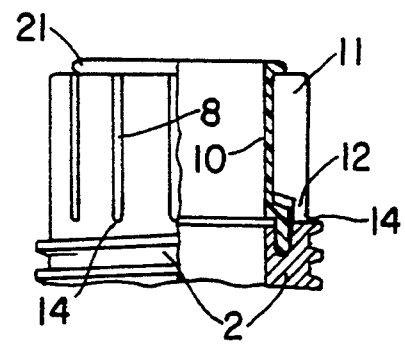
FIG. 33 is a similar view of another combination wherein the first turn of the external thread is located at the level of the socket in the clamping device.
Figure 34:
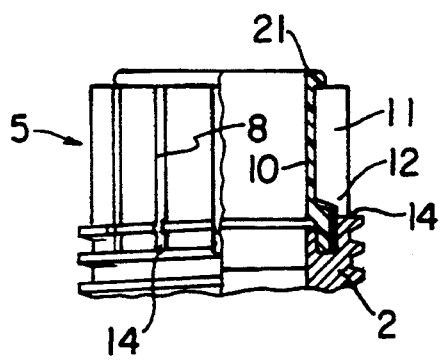
FIG. 34 is a similar view of a further combination wherein the closed ends of the slots extend into the nearest turns of the external thread.

FIG. 32 shows that the closed ends 14 of the slots 8 are spaced apart from the nearest turn of the external thread 2a. In the embodiment of FIG. 33, the closed ends 14 of the slots 8 are located at the axial level of the nearest turn of the thread 2a. The first portions 11 of the prongs which are shown in FIGS. 32 and 33 are relatively long; their length is several times the length of the respective second portions 12. FIG. 34 shows that the slots 8 can extend into one or more neighboring turns of the thread 2a. An advantage of such design is that the nut 3 (not shown in FIGS. 32 to 34) can actually deform the nearest portion of the thread 2a; this facilitates the flexing of prongs and reduces the likelihood of unintentional loosening of the threaded connection between the nut and the sleeve 2.

FIGS. 35 and 36 show that the slots 8 between neighboring prongs 9 can include relatively narrow first portions between the first portions 11 of the prongs and much wider second portions 28 between the second portions 12 of the prongs. Each wider second portion 28 can consist of two mirror symmetrical halves provided in the neighboring prongs 9. Alternatively, a wider first part of a second portion 28 can be provided in one of the neighboring prongs 9 and a narrower second part of the same second portion 28 can be provided in the other neighboring prong. The arrangement can be such that each of the wider second portions 28 extends into only one of the neighboring prongs 9. The provision of wider second portions 28 enhances the flexibility and deformability of second portions 12 of the prongs 9.

The wider portions 28 of the slots 8 may but need not be as long as the second portions 12 of the prongs 9. In other words, it is possible to design the prongs 9 of FIGS. 35 and 36 in such a way that each prong includes a first portion 11 of a first width (as measured in the circumferential direction of the clamping device 5) and a second portion 12 including a part having the same width as the respective first portion 11 and a part having a greatly reduced width (due to the provision of enlarged portions 28).

If the clamping device 5 which is shown in FIGS. 35 and 36 is made of a plastic material, it can be provided with membranes 30 which extend across the slots 8, particularly across the wider portions 28 of the slots. This enhances the sealing action when the prongs 9 are deformed by the surface 6 of the nut 3 (not shown in FIGS. 35 and 36). The membranes 30 can extend across parts of or across the entire wide portions 28 of the slots 8. These membranes are relatively thin so that they can be readily severed and/or folded during flexing of the prongs 9 toward the axis of the clamping device 5 to enhance the sealing action of the device 5 in the region of wider portions 28 of the slots 8 when the deforming or flexing step is completed.

The wider portions 28 of the slots 8 enhance the flexibility of the second portions 12 and thus enable the first portions 11 to assume optimal orientation for proper deformation of the seal 10 and proper sealing and/or clamping engagement with an article (not shown in FIGS. 35 and 36).

Figure 37A:
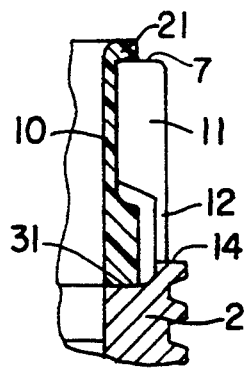
FIG. 37a is a fragmentary axial sectional view of a fitting with the nut omitted, the deepmost portion of the slot in the clamping device being bounded by a radially extending surface of the clamping device.

FIGS. 37a to 37e illustrate portions of additional embodiments of the improved fitting. More specifically, these Figures illustrate different shapes of the surface 19 forming part of the clamping device and surrounding the socket 18 for the adjacent reinforcing rim 10a of the seal 10. The first portion 11 of the prong which is shown in FIG. 37a has a length approximately twice that of the second portion 12. The surface 19 includes a flat annular portion 31 which extends substantially radially of the clamping device so that the depth of the socket 18 in the axial direction of the clamping device is practically nil. The barrier or skirt 17 is omitted.

Figure 37B:
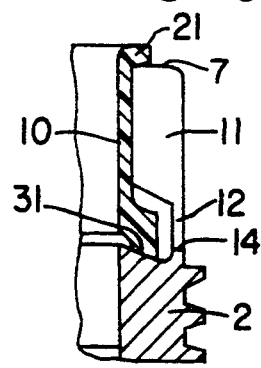
FIG. 37b is a similar view but showing a different prong and a different configuration of the surface bounding the socket for one axial end of the seal.

In the embodiment of FIG. 37b, the length of the second portion 12 is even less than in the embodiment of FIG. 37a. The flat portion 31 of the surface 19 bounding the socket 18 has a frustoconical shape so that the socket includes a portion of maximum depth which is remote from the internal surface of the sleeve 2. Axial stressing of the seal 10 (e.g., as a result of deformation of second portions 12) can result in some slippage along the conical portion 31 toward the end faces 7 of the prongs 9.

Figure 37C:
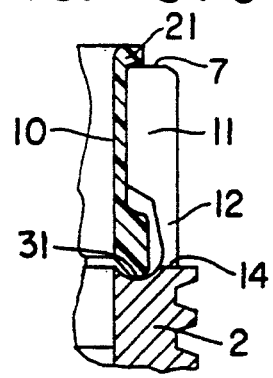
FIG. 37c is a similar view of a modification of the structures which are shown in FIGS. 37a and 37b.

The portion 31 of the surface 19 which is shown in FIG. 37c is concave so that the deepmost portion of the socket 18 is nearer to the internal surface of the sleeve 2 than in the embodiment of FIG. 37b. The concave portion 31 of the surface 19 ensures desirable centering of the rim 10a in the socket 18. FIG. 37c further shows that the thickness of the second portion 12 of the prong decreases nearly all the way from the respective first portion 11 to the closed ends of the adjacent slots. The closed ends of the slots are offset from the deepmost portion of the socket 18.

Figure 37D:
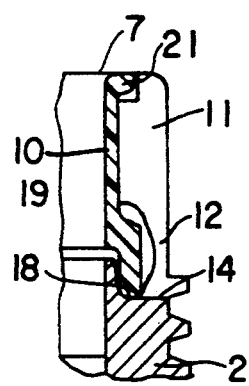
FIG. 37d is a similar view of a modification of the structures which are shown in FIGS. 37a to 37c.

FIG. 37d illustrates a prong wherein the thickness of the second portion 12 first decreases gradually from the adjacent first portion 11 toward the sleeve 2 and thereupon increases, again at least substantially gradually, toward the closed ends 14 of the adjacent slots. The internal face of the second portion 12 merges gradually into the adjacent portion of the surface 19 surrounding the socket 18. The closed ends 14 of the slots are located at the level of the deepmost portion of the socket 18. Furthermore, and as already described with reference to FIG. 32, the closed ends 14 of the slots 8 are located within the external thread 2a, i.e., each slot can extend across one or more turns of this thread.

Figure 37E:
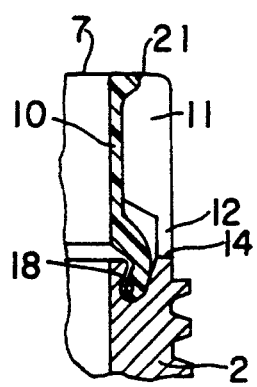
FIG. 37e is a similar view of a modification of the structures which are shown in FIGS. 37a to 37d.

FIG. 37e shows that the surface 19 includes an undercut portion between the skirt 17 and the socket 18. This ensures even more reliable retention of the rim 10a in the socket 18 even if the seal 10 is subjected to a pronounced tensional stress during flexing of the prongs toward the axis of the clamping device. The thickness of the second portion 12 which is shown in FIG. 37e is constant all the way from the sleeve 2 to the first portion 11.

Figure 38:
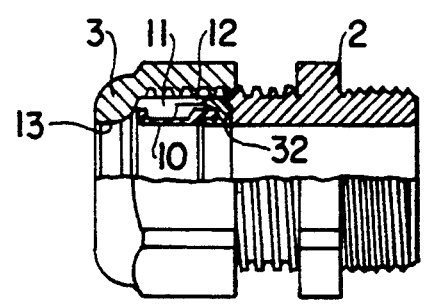
FIG. 38 is a partly elevational and partly axial sectional view of a partially assembled fitting wherein the clamping device constitutes a separately produced part.
Figure 39:
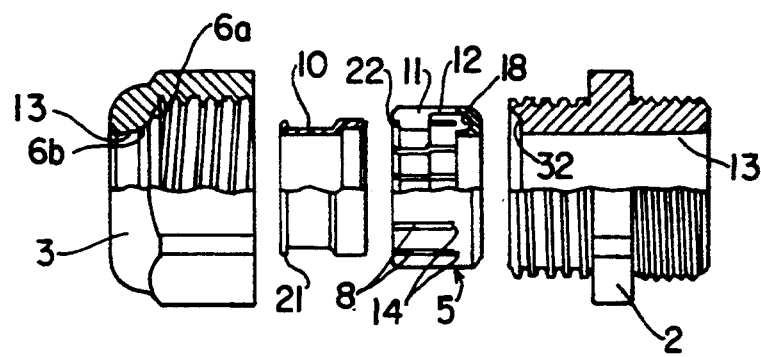
FIG. 39 is an exploded partly elevational and partly axial sectional view of the fitting which is shown in FIG. 38.

FIGS. 38 and 39 illustrate a fitting wherein the clamping device 5 is a separately produced part and the sleeve 2 has at its first end a shallow recess 32 for the adjacent (unslotted) axial end of the device 5. In all other respects, the device 5 and/or the seal 10 can be configured, dimensioned and manipulated in the same way as described with reference to FIGS. 1 to 37e. Thus, the discrete clamping device 5 is also provided with prongs having thicker portions 11 and thinner portions 12 adjacent the closed ends 14 of the neighboring slots 8. The internal surface of the device 5 is provided with a socket 18 for the reinforcing rim 10a of the seal 10.

Figure 40:
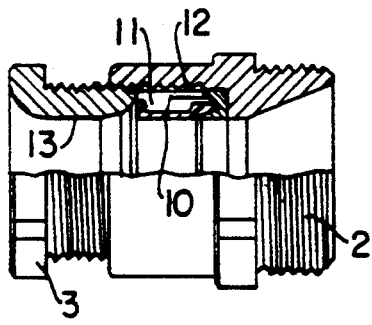
FIG. 40 is a partly elevational and partly axial sectional view of a fitting wherein the clamping device and the seal are confined in the one component.
Figure 41:
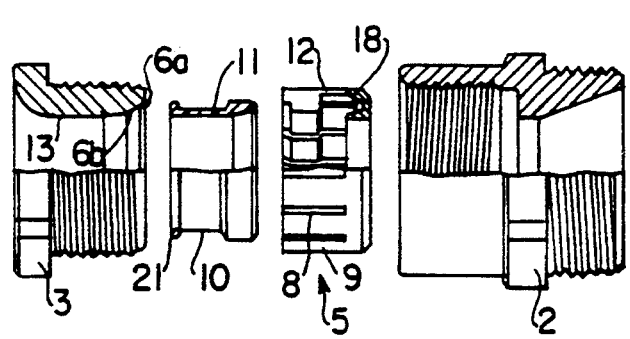
FIG. 41 is an exploded partly elevational and partly axial sectional view of the fitting of FIG. 41.

FIGS. 40 and 41 show a fitting wherein the nut is replaced with an annular plug 3 having an external thread 3a movable into mesh with the internal thread 2a of the sleeve 2. The end faces 7 of prongs 9 forming part of the separately produced clamping device 5 abut the deforming surface which is provided at the adjacent axial end of the plug 3. The entire clamping device 5 is recessed into the sleeve 2 when the fitting of FIGS. 40 and 41 is in actual use. The illustrated deforming surface has a radially outer portion 6a and a radially inner portion 6b. The mode of utilizing the fitting of FIGS. 40 and 41 is analogous to the mode of utilizing the previously described fittings.

Figure 42:
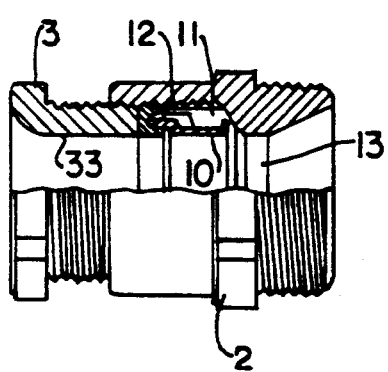
FIG. 42 is a partly elevational and partly axial sectional view of a partially assembled fitting which constitutes a modification of the fitting of FIG. 40.
Figure 43:
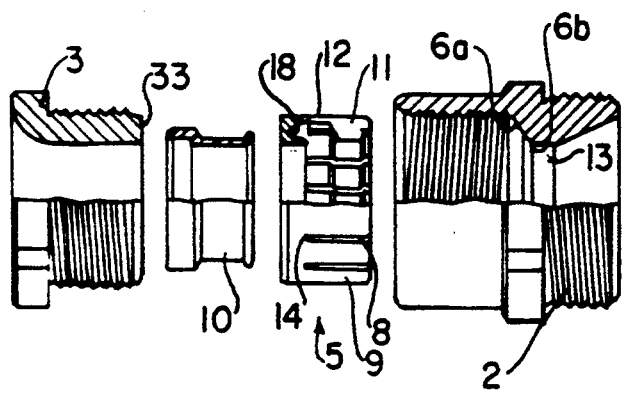
FIG. 43 is an exploded partly elevational and partly axial sectional view of the fitting which is illustrated in FIG. 42.

The fitting of FIGS. 42 and 43 is constructed in such a way that the deforming surface is provided in the sleeve 2 and the plug 3 serves to urge the prongs 9 of a discrete clamping device 5 against the deforming surface when the plug is driven into the adjacent portion of the sleeve (as shown in FIG. 42). The device 5 of FIGS. 42 and 43 is inverted by 180° with reference to the device 5 of FIGS. 40 and 41. The reference character 33 denotes that (radially extending) end face of the annular plug 3 which serves to advance the discrete clamping device 5 deeper into the sleeve 2 in order to enable the deforming surface to flex the prongs 9 radially inwardly and to thus deform the seal 10 against the outer surface of an article (not shown in FIGS. 42 and 43). The surface 33 bears against a radially extending end face 33a of the discrete clamping device 5. The deforming surface comprises a radially outer conical portion 6a and a radially inner conical portion 6b which is inclined with reference to the portion 6a.

The reference characters 2e and 3e respectively denote polygonal portions of the two components. Such polygonal portions can be engaged by suitable tools (e.g., wrenches, not shown) which are used to rotate the component 2 or 3 relative to the other component or to hold one of the components against rotation with or relative to the other component.

An important advantage of the improved fitting is that the first and second portions 11, 12 of the prongs 9 can perform different functions and that they can perform such functions more satisfactorily than various portions of conventional prongs, e.g., of the type disclosed in the aforediscussed German Utility Model of Holzmann. Thus, selected portions (12) of the prongs 9 can be made readily flexible to enable the other portions (11) to perform their intended functions with utmost accuracy and efficiency. The portions 11 can be rigid to ensure satisfactory deformation of the seal 10 and/or satisfactory clamping engagement with the outer surface of an article 4. Moreover, such configuration of the prongs 9 renders it possible to apply the fitting to a cable or the like with the exertion of a relatively small force even if the distance which is covered by the components 2 and 3 during threading into each other is very short. The assembled fitting offers a pronounced resistance to tensional stresses, and its clamping and sealing action remains intact for long periods of time. The relatively thick first portions 11 are preferably located at the end faces 7 of the prongs 9 because these portions must take up the forces which develop as a result of deformation of the seal 10 and frictional engagement of the seal with the outer surface of an article and/or direct clamping engagement between such outer surface and the internal faces of the first portions 11. Furthermore, and since the relatively thick first portions 11 are located at the end faces 7 of the prongs 9, relatively small radial flexing of the prongs suffices to ensure the establishment of the desired sealing and/or clamping action.

Another important advantage of the improved fitting is that it can employ a relatively thin cylindrical or similar seal 10. The reason is that the constriction of the seal toward sealing and frictional engagement with the outer surface of an article 4 is predictable and uniform all the way around the circumference of the article. The extent of flexing of prongs having thicker and thinner portions 11 and 12 can be readily selected in such a way that a fitting can be used to properly engage an article 4 of very small outer diameter as well as an article whose diameter matches or approximates the diameter of the passage 13.

The effectiveness of the fitting, particularly the magnitude of the clamping force, can be selected practically at will by the simple expedient of selecting the thickness of the first portions 11 in relation to the difference between the root diameters of the threads 2a, 3a and the diameter of the passage 13. For example, the clamping action can be enhanced by increasing the ratio of thickness of the portions 11 relative to the difference between the two diameters, e.g., in such a way that the thickness of a portion 11 approximates 75 percent of the difference. The thickness of the seal 10 is reduced if the thickness of the first portions 11 is increased. In fact, the seal 10 can be omitted, or its size can be reduced in a manner as shown, for example, in FIGS. 12a and 13a, if the sealing action is less important than the clamping action. Thus, the first portions 11 can be caused to move into direct engagement with the outer surface of the article 4, and the seal 10 (if used at all) serves to establish a fluidtight barrier between the article and the mating components 2, 3 only in the region radially inwardly of the second portions 12 of the prongs. The clamping action and the ability of the assembled fitting to resist tensional stresses is enhanced if the first portions 11 are caused to engage the outer surface of the article 4. This will be appreciated by bearing in mind that, in such fittings, it is not necessary to apply forces for the purpose of deforming the seal 10 between the internal faces of the first portions 11 and the outer surface of the article 4.

If the fitting is designed in a manner as shown in FIGS. 10 and 13a–13d, i.e., in such a way that the first portions 11 of the prongs 9 are caused to enter the passage 13, the clamping action between the first portions 11 and the article 4 or between the article and the deformed seal 10 can remain unchanged for any desired period of time and will change only in response to aging of the material of the article 4 and/or seal 10. Moreover, even slight rotation of the components 2 and 3 relative to each other will not alter the quality of the clamping and sealing actions, as long as the first portions 11 continue to extend into the passage 13 wherein they engage the surface 13a. The second portions 12 can be weakened by reducing their thickness in the radial direction of the clamping device 5 and/or by reducing their width in the circumferential direction of the device 5, e.g., in a manner as shown in FIGS. 35 and 36. All this ensures that the application of relatively small torque suffices to ensure full penetration of the externally threaded component into the internally threaded component with attendant flexing of the prongs 9 toward the axis of the article in the passages 13 and 2c. All this can be achieved without unduly weakening the component 3, even if the diameter of the article to be clamped is small. The radially inward flexing of the prongs 9 can be selected to permit proper engagement of a small-diameter article 4 even if the clearance between the outer surface of the article and the surface 13a in the nut or plug 3 is very pronounced.

The design and operation of the improved fitting are based on the recognition that it is not necessary to increase the clamping force if a small-diameter article is replaced by a large-diameter article, i.e., if the fitting remains the same. Thus, at least in many instances, prongs 9 with first and second portions 11, 12 of a particular size and shape can be used to properly clamp and seal articles 4 having very small or very large outer diameters.

Prongs 9 of the type shown, for example, in FIG. 1 (wherein the external faces of the first portions 11 are flush with the external faces of the second portions 12) exhibit the advantage that the area of contact with the internal surfaces of the nut 3 is increased to a maximum possible value. This enhances predictable flexing of the prongs 9 and reliable retention of the prongs in flexed condition. On the other hand, prongs 9 of the type shown in FIGS. 12c and 13c (wherein the first portions 11 extend radially inwardly and radially outwardly beyond the respective second portions 12) exhibit the advantage that the second portions 12 can be more reliably flexed in an optimal way to ensure desirable orientation and positioning of first portions 11 when the assembly of the fitting is completed. Such design is particularly desirable if the second portions 12 are rather long, e.g., longer than the first portions 11.

As can be seen in FIGS. 37a–37e, the thickness of the second portions 12 can be constant from end to end, it can decrease in a direction away from the respective first portions 11, it can increase in a direction toward the respective first portions, or it can increase in part and decrease in part in a direction toward the first portions.

if the clamping action of the improved fitting is important or most important, the length of the prongs 9 and the ratio of the lengths of their portions 11 and 12 will be selected in such a way that the external faces of the first portions will continue to bear against the deforming surface 6 (see, for example, FIGS. 24, 26 and 28–30) when the assembly of the fitting is completed. This ensures that the clamping force is transmitted to the outer side of an article 4 from the surface 6 directly through the non-deformable or not readily deformable first portions 11 of the flexed prongs.

The length of the second portions 12 of the prongs need not exceed 3T wherein T is the thickness of the second portions. Such second portions are relatively short and can be resorted to with advantage when the first portions 11 extend radially inwardly beyond the internal faces of the second portions 12 (see, for example, FIGS. 23, 25 and 27). Thus, the length of the first portions 11 can greatly exceed the length of the second portions 12. Such fittings are preferably designed to provide sockets 18 which are axially spaced apart from the relatively short second portions 12 (refer again to FIGS. 23, 25 and 27).

As a rule, the prongs 9 should not extend beyond the passage 13. Thus, and referring for example to FIG. 10, the effective length of inwardly flexed prongs 9 in a fully assembled fitting 1 should not exceed the distance between the first end of the sleeve 2 and the second (upper) end of the nut 3. An advantage of a fitting wherein the first portions 11 of the prongs 9 extend into and are at least nearly completely received in the passage 13 to effect at least some radial deformation of the clamped article 4 is that the exertion of an axial pull upon the clamped article cannot result in any weakening of the clamping and sealing actions because the external faces of the first portions 12 bear directly against the surface 13a and cannot yield radially outwardly in response to the exertion of such pull.

Fittings of the type shown in FIGS. 12a–13d can be used with particular advantage in connection with the clamping of cables having relatively small diameters. The relatively long and readily flexible second portions 12 of the prongs 9 enable the first portions 11 to move radially inwardly as close to the common axis of the components 2 and 3 as is necessary in order to properly engage the outer surface of a small-diameter cable 4. The relatively long second portions 12 can be flexed in the aforedescribed manner, namely in a first direction from the sleeve 2 to the turning point 16 and thereupon in a different second direction from the point 16 to the adjacent ends of the respective first portions 11. Such pronounced flexibility of the second portions 12 enhances the versatility of the fitting because the positions and orientation of the first portions 11 can readily conform to the existing requirements in dependency on the difference between the outer diameter of an article 4 and the diameter of the passage 13, the elasticity of the article, the elasticity of the seal 10 and/or the desired magnitude of the clamping and sealing actions.

Another advantage of relatively long second portions 12 is that the overall length of the fitting can be reduced because the deformed S-shaped or Z-shaped second portions enable the first portions 11 of the prongs to cover a considerable distance radially inwardly rather than moving in the axial direction of the components 2 and 3. The feature that the first portions 11 of the prongs 9 can extend into the passage 13 also contributes to a reduction of the length of the assembled fitting. As mentioned before, such design further enhances the ability of the connection of a fitting with an article 4 to stand pronounced tensional stresses which would tend to effect an axial-movement of the article and the fitting relative to each other. The second portions 12 of the prongs can bear against the deforming surface 6 or 6a+6b if the first portions 11 extend into the passage 13.

The provision of slots 8 which are inclined relative to the axis of the clamping device 5, namely which do not extend exactly radially of the clamping device, can also result in improved clamping action.

An advantage of the clamping device 5 which is shown in FIG. 3 is that it enhances the versatility of the fitting. For example, if the fitting including the sleeve 2 of FIG. 3 is to be attached to a small-diameter article 4, the relatively short first portions 11 will or can extend all the way into the passage 13 of the nut 3 (e.g., in a manner as shown in FIG. 10) because the corresponding second portions 12 are relatively long and can readily assume an S-shaped or Z-shaped outline, i.e., the readily flexible and relatively long second portions 12 of prongs having short first portions 11 can extend well toward the axis of the nut 3 and also into the passage 13. On the other hand, the relatively long first portions of the clamping device 5 which is shown in FIG. 3 will assume inclined positions as shown, for example, in FIGS. 8 and 11 to exert a stronger pressure against the seal 10 or directly against the outer surface of an article 4. Thus, the prongs 9 of one and the same clamping device 5 can furnish different clamping actions by resorting to the expedient which is shown in FIG. 3, i.e., by providing the device 5 with prongs 9 having relatively short first portions 11 and relatively long second portions 12 as well as with prongs having relatively short second portions 12 and long first portions 11. The overall length of all of the prongs 9 forming part of the clamping device 5 of FIG. 3 can be the same.

The sleeve 2 and the clamping device 5 can be made of a suitable plastic material, especially if the device 5 is of one piece with the sleeve.

An advantage of the fitting wherein the first portions 11 of the prongs 9 extend into the passage 13 of the nut 3 is that the deforming surface 6 is then free to engage the external faces of the second portions 12 (FIG. 10). Thus, the combined area of contact between the nut 3 and the prongs 9 is very large. This is of particular advantage if the fitting should be held against axial movement relative to the clamped article 4 and/or vice versa. As already described hereinabove, the surface 13a bounding the passage 13 can be a conical surface which diverges toward or away from the deforming surface 6, or a cylindrical surface with gradual or abrupt transition into the deforming surface.

Figure 6:
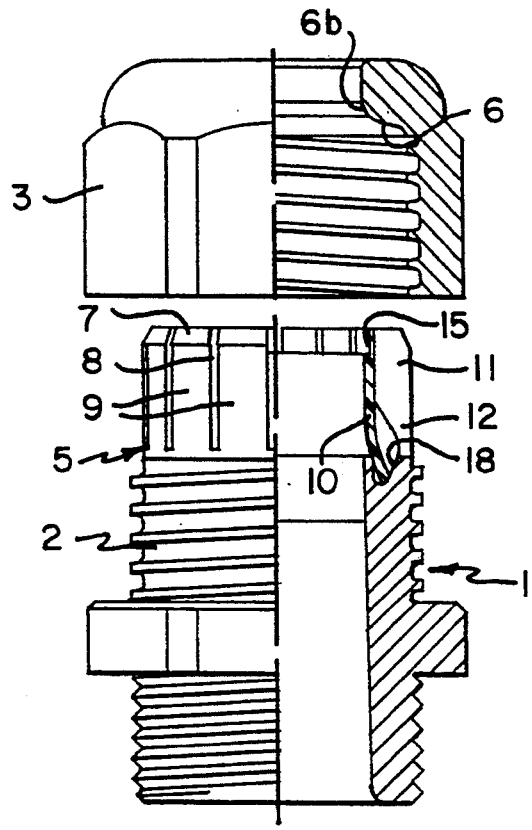
FIG. 6 is an exploded partly elevational and partly axial sectional view of a fitting wherein the first portions of the prongs extend beyond the annular seal and the seal does not touch the second portions of the prongs.
Figure 7:
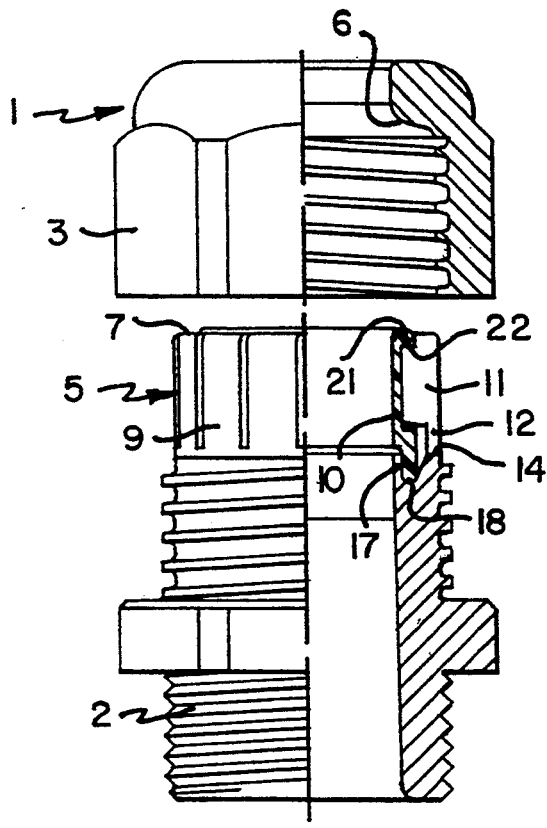
FIG. 7 is an exploded partly elevational and partly axial sectional view of a fitting wherein the seal constitutes a modification of the seal which is shown in FIG. 1.

FIG. 6 shows that the prongs 9 can be provided with wedge-shaped end portions at the end faces 7. The thicker first portions 11 of the prongs can be obtained by bonding portions of metallic or plastic material to rudimentary prongs having a constant thickness all the way from the end faces 7 to the closed ends 14 of the adjacent slots 8. Furthermore, it is equally within the purview of the invention to employ a clamping device 5 having prongs 9 with relatively thick first portions 11 and relatively thin second portions 12 in addition to prongs whose thickness is constant from end to end.

If the deforming surface of the nut 3 is configurated in a manner as shown in FIG. 12c or 12d, the ratio of the radial dimensions and the mutual inclination of the portions 6a, 6b is or can be selected in such a way that the first portions 11 or the seal 10 will contact the outer surface of an article at a time when the first portions 11 complete the tracking of the radially outer portion 6a, i.e., when the stage of rapidly flexing the prongs 9 under the action of the radially outer portion 6a is completed. In fact, and if the outer layer of a cable or another article 4 is rather soft, the dimensions of the radially outer portion 6a can be such that this portion continues to induce a radially inward movement of the first portions 11 subsequent to initial contact between the prongs and/or seal 10 on the one hand and the outer surface of the article on the other hand. This ensures that the initial threading of the sleeve 2 into the nut necessitates a relatively small axial displacement of the components 2 and 3 relative to each other. The radially inner portion 6b of the deforming surface takes over when the first portions 11 and/or the seal 10 encounter a greater resistance to further radially inward movement. The extent of axial movement of the components 2, 3 relative to each other in relation to the extent of radially inward movement of the first portions 11 is then increased; however, such further radially inward movement of the portions 11 is achieved in response to the application of a relatively small torque. Thus, the portions 6a, 6b of the deforming surface enable the improved fitting of the type shown in FIGS. 12c and 12d to meet certain contradictory requirements, such as (a) ensuring the establishment of a pronounced clamping action without unduly increasing the torque which is required to rotate the components 2 and 3 relative to each other, and (b) ensuring that a satisfactory clamping action can be achieved in response to relatively small axial displacement of the two components into each other.

The slotted rim 21 which is shown in FIGS. 16 and 16a constitutes an optional but desirable and advantageous feature of the improved seal 10. This rim can extend into the recesses 22 or 23 of the prongs 9 to prevent undesirable rolling or other axial shifting of the seal 10 relative to the clamping device 5 during flexing of the prongs toward the axis of the clamping device. The width of the slots 26 decreases as the reduction of the diameter of the rim 21 proceeds, and the reduction can reach a stage when the width of the slots 26 is reduced to zero so that the neighboring teeth 27 contact each other and further reinforce the deformed seal 10 at the end which is adjacent the end faces 7 of the deformed prongs.

The reinforcing or stiffening means for the seal 10 can assume any one of the aforedescribed shapes including rims 21 and 10a as well as trapezoidal protuberances 10c. Furthermore, one or more selected portions of the seal 10 can be reinforced in a number of additional ways, e.g., by a grating of intersecting axially parallel and circumferentially extending reinforcing ribs or the like. The reinforcing or stiffening means can establish a form-locking connection between the seal 10 and the clamping device 5 if the internal surfaces 15 of the prongs 9 are provided with complementary recesses which can receive parts of or the entire reinforcing or stiffening means on the external surface of the seal.

In order to enable a particular fitting t to serve its purpose in connection with the clamping of cables or other articles 4 having a relatively large, medium large or small outer diameter, the deforming surface of the nut 3 and/or the external surfaces of the prongs 9 can be configurated in such a way that the external surfaces of the prongs, particularly the external faces of the first portions 11 of the prongs, remain in full or at least substantial contact with the internal surface of the nut 3 irrespective of the diameter of the clamped workpiece. The arrangement can be such that the orientation of the first portions 11 in assembled condition of the fitting depends upon the diameter of the clamped article 4. This ensures that the clamping action is the same, or at least nearly the same, irrespective of the diameter of the clamped article. In other words, the flexing of prongs 9 can be controlled in such a way that at least the first portion 11 of each of these prongs assumes a predetermined radial position and a predetermined orientation in each of a plurality of different axial positions of the mating components 2 and 3 relative to each other.

The improved fitting can operate with a very thin seal 10 because proper deformation of this seal can be achieved in any of the aforedescribed numerous ways, e.g., by weakening one or more selected portions of the seal in order to ensure predictable deformation and/or by reinforcing one or more selected portions of the seal in order to prevent unpredictable deformation. The utilization of a relatively thin seal is preferred in many instances because the clamping action of the prongs 9 upon the article 4 which extends through the mating components 2 and 3 is more satisfactory. Even a very thin seal 10 can be subjected to predictable deformation by resorting to one or more of the aforediscussed undertakings, and this can be ensured even if the seal must undergo pronounced deformation before it moves into contact with the outer surface of an article 4, i.e., before the seal is propped from within as a result of engagement with the articles.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A fitting for engaging outer surfaces of articles, comprising first and second tubular components each having a first end and a second end, said first and second components respectively having complementary external and internal threads at the first ends thereof and one of said components having a substantially ring-shaped internal deforming surface and an axial article-receiving passage adjacent said deforming surface, said passage having a diameter smaller than a root diameter of one of said threads; and a tubular clamping device carried by the other of said components and comprising an annulus of substantially axially parallel deformable prongs and elongated slots alternating with said prongs, each of said slots having a closed end and an open end and each of said prongs having an end face at the open ends of adjacent slots, an internal surface and an external surface, said device being disposed at the first end of said other component and said end faces being engaged and moved by said deforming surface radially inwardly of said device in response to threading of said components into each other, at least some of said prongs having first portions and second portions which, in undeformed condition of said prongs, are of substantially constant greater radial thickness and lesser radial thickness, respectively, the thickness of said first portions being at least 60 percent of the difference between said diameters.

2. The fitting of claim 1, further comprising a deformable annular seal disposed within said annulus of prongs and being biased radially inward, at least by said first portions, in response to radially inward movement of said end faces.

3. The fitting of claim 1, wherein the thickness of the first portions of said at least some prongs is at least 75 percent of the difference between said diameters.

4. The fitting of claim 1, wherein the thickness of the first portions of said at least some prongs at least approximates the difference between said diameters.

5. The fitting of claim 1, wherein the first portions of said at least some prongs extend radially inwardly of said device beyond the respective second portions.

6. The fitting of claim 1, wherein the first portions of said at least some prongs extend radially outwardly of said device beyond the respective second portions.

7. The fitting of claim 1, wherein the first portions of said at least some prongs extend radially inwardly and radially outwardly of said device beyond the respective second portions.

8. The fitting of claim 1, wherein the first portions of said at least some prongs are disposed adjacent the end faces of the respective prongs.

9. The fitting of claim 1, wherein the first portions of said at least some prongs are spaced apart from the closed ends of the adjacent slots.

10. The fitting of claim 1, wherein said prongs are elongated and are deformable to a maximum extent as a function of the parameters of an article extending through said passage, the ratio of the length of said first portions to the length of the respective second portions being such that those portions of said external surfaces which are provided on said first portions contact said deforming surface during maximum deformation of said at least some prongs.

11. The fitting of claim 1, wherein said prongs are elongated and are deformable to a maximum extent as a function of the parameters of an article extending through said passage, the length of said second portions being such that each second portion extends at most to said passage in response to maximum deformation of the respective prong.

12. The fitting of claim 1, wherein said prongs are elongated and the length of said second portions at most equals 3T wherein T is the radial thickness of a second portion.

13. The fitting of claim 1, further comprising a deformable annular seal disposed within said annulus of prongs and being biased radially inward by said first portions in response to radially inward movement of said end faces, said device having an annular socket for a portion of said seal, said socket extending beyond the closed ends of said slots in a direction away from said open ends.

14. The fitting of claim 1 for an article extending through and substantially filling said passage and having an outer surface which defines with said annulus of prongs an annular clearance in undeformed condition of said prongs, further comprising an annular seal disposed within said annulus of prongs and at least partially filling said clearance, said seal being biased in response to deformation of said prongs by said deforming surface.

15. The fitting of claim 1, wherein said passage is disposed radially inwardly of said first component when said components are threaded into each other, said prongs being elongated and the first portions of said at least some prongs extending into said passage upon deformation of said prongs by the deforming surface of said one component.

16. The fitting of claim 1, wherein said second portions have a substantially S-shaped or Z-shaped outline in response to deformation of the respective prongs by said deforming surface.

17. The fitting of claim 1, wherein said at least some prongs have a length between the respective end faces and the closed ends of the adjacent slots such that said first portions extend at least in part into said passage in response to deformation of said prongs.

18. The fitting of claim 1, wherein said deforming surface tapers toward said passage, said first portions being disposed at least in part within said passage and said second portions being at least closely adjacent said deforming surface in response to deformation of said prongs by said deforming surface as a result of threading of said components into each other.

19. The fitting of claim 1, wherein said slots include first portions between the first portions of the prongs and second portions between the second portions of the prongs, at least the first portions of said slots being disposed in planes bypassing the axis of said device.

20. The fitting of claim 1, wherein said slots have narrower first portions between the first portions of said at least some prongs and wider second portions between the second portions of the prongs.

21. The fitting of claim 1, wherein the end faces of said at least some prongs are profiled.

22. The fitting of claim 1, wherein the internal surfaces of said at least some prongs are profiled.

23. The fitting of claim 1, wherein said device comprises at least three equidistant prongs having thicker first and thinner second portions.

24. The fitting of claim 1, wherein said device is of one piece with the first end of said other component.

25. The fitting of claim 1, wherein said clamping device is a discrete part which is separable from said other component and said other component has an annular recess provided at the first end thereof and arranged to receive an axial end of said clamping device which is remote from the end faces of said prongs.

26. The fitting of claim 1, wherein said deforming surface is adjacent the closed ends of said slots when said components are threaded into each other.

27. The fitting of claim 1, wherein said prongs include sections which are adjacent the first end of said other component and said deforming surface is adjacent said sections of said prongs when said components are threaded into each other.

28. The fitting of claim 1, wherein said deforming surface includes a radially outer portion having a first inclination relative to the axis of said one component and a radially inner portion having a more pronounced second inclination relative to the axis of said one component.

29. The fitting of claim 1, wherein said deforming surface includes a frustoconical radially outer portion having a first inclination relative to the axis of said one component, and a frustoconical radially inner portion having a greater second inclination relative to the axis of said one component.

30. The fitting of claim 1, wherein said deforming surface includes a radially outer portion having a first inclination and a radially inner portion having a different second inclination relative to the axis of said one component, one of said inclinations being greater than the other of said inclinations and said first portions of said at least some prongs being engaged by that portion of said deforming surface whose inclination is greater when said components are threaded into each other and said deforming surface deforms said prongs radially inwardly.

31. The fitting of claim 1, wherein said external surfaces form part of a composite substantially cylindrical surface having a diameter which at least approximates said root diameter in undeformed condition of said prongs.

32. The fitting of claim 1, wherein the external faces of said first portions form a first composite cylindrical surface having a diameter which at least approximates said root diameter and the external faces of said second portions form a second composite cylindrical surface having a diameter less than said root diameter.

33. The fitting of claim 1, further comprising an annular seal disposed within said annulus of prongs and being contacted by said deforming surface in response to threading of said components into each other.

34. The fitting of claim 1, further comprising an annular seal within said annulus of prongs, said seal being spaced apart from said second portions of said at least some prongs.

35. The fitting of claim 1, further comprising a deformable annular seal surrounded by said annulus of prongs and having a first and a second axial end and a slotted rim at one of said ends.

36. The fitting of claim 1, wherein said first portions have external faces forming part of the respective external surfaces and sliding along said deforming surface in response to threading of said components into each other.

37. The fitting of claim 1, wherein said deforming surface has a plurality of circumferentially extending steps and gradual transitions between said steps.

38. The fitting of claim 1, wherein said deforming surface has a plurality of circumferentially extending steps and substantially conical transitions between said steps.

39. The fitting of claim 1, wherein said prongs include undercut portions adjacent the respective second portions.

40. The fitting of claim 1, wherein said first portions extend into said passage in response to threading of said components into each other to reduce the effective cross-sectional area of said passage to a predetermined extent.

41. The fitting of claim 1, wherein each of said at least some prongs is elongated and the length of each of said first portions is at most two thirds of the length of the respective prong.

42. The fitting of claim 41, wherein the length of each of said first portions approximates one-half the length of the respective prong.

43. The fitting of claim 41, wherein the length of each of said first portions approximates one-third of the length of the respective prong.

44. The fitting of claim 41, wherein the first portions of said at least some prongs extend radially outwardly of said device beyond the respective second portions.

45. The fitting of claim 1, wherein said second portions are disposed nearer to the closed ends of the adjacent slots than the respective first portions, said second portions being elongated in directions from the closed ends of the adjacent slots toward the end faces of the respective prongs and their radial thicknesses decreasing along approximately half the distance from the respective first portions toward the closed ends of the adjacent slots.

46. The fitting of claim 45, wherein said first portions extend radially inwardly of said device beyond the respective second portions.

47. The fitting of claim 45, wherein said first portions extend radially outwardly of said device beyond the respective second portions.

48. The fitting of claim 1, wherein at least one of the internal and external surfaces of said at least some prongs has a facet between the respective first and second portions.

49. The fitting of claim 48, wherein said facets extend substantially radially of said device.

50. The fitting of claim 48, wherein said facets are concave.

51. The fitting of claim 48, wherein said facets are flat.

52. The fitting of claim 48, wherein said facets make oblique angles with the axis of said device.

53. The fitting of claim 1, wherein said second portions of said at least some prongs are adjacent the closed ends of the adjoining slots and are bent toward the axis of said device in response to deformation of said prongs by the deforming surface of said one component.

54. The fitting of claim 53, wherein said second portions make with the axis of said device an oblique angle in response to deformation of said prongs and the outline of each deformed second portion has a turning point adjacent the respective first portion.

55. The fitting of claim 54, wherein said outline has a first curvature between the closed ends of the adjacent slots and the respective turning point, and a different second curvature between the turning point and the respective first portion.

56. The fitting of claim 1, wherein said at least some prongs include at least one first prong having a relatively short first portion and at least one second prong having a relatively long first portion, said first portions of said first and second prongs extending from the respective end faces toward the closed ends of the adjacent slots.

57. The fitting of claim 56, wherein said first and second prongs have different orientations relative to the axis of said device in response to deformation by said deforming surface.

58. The fitting of claim 1, further comprising a deformable annular seal within said annulus of prongs, said seal having a rim remote from said end faces and said device having an annular socket at the closed ends of said slots, said rim being received in said socket.

59. The fitting of claim 58, wherein said device further comprises a skirt which is surrounded by said socket.

60. The fitting of claim 58, wherein the thread of said other component has a first turn at said socket.

61. The fitting of claim 58, wherein the thread of said other component has a first turn which is spaced apart from said socket in the axial direction of said other component.

62. The fitting of claim 58, wherein the thread of said other component has a first turn at said socket and the closed ends of said slots extend into the thread of said other component.

63. The fitting of claim 58, wherein said device has a surface surrounding said socket and the closed ends of said slots are at least closely adjacent said surface of said device.

64. The fitting of claim 62, wherein said second portions are disposed at the closed ends of adjacent slots and said slots have narrower portions between the first portions of said at least some prongs and wider portions between the second portions of said at least some prongs.

65. The fitting of claim 62, wherein said socket has a deepmost portion and the closed ends of said slots are located at the deepmost portion of said socket.

66. The fitting of claim 1, wherein said device further comprises membranes extending across at least a portion of each of said slots at the external surfaces of said prongs.

67. The fitting of claim 66, wherein said membranes are adjacent the closed ends of the respective slots.

68. The fitting of claim 1, wherein said one component has an annular surface which surrounds said passage and is engaged by the first portions of said at least some prongs when said at least some prongs are deformed in response to threading of said components into each other.

69. The fitting of claim 68, wherein said annular surface has a conical shape.

70. The fitting of claim 68, wherein said annular surface has a substantially cylindrical shape.

71. The fitting of claim 1, wherein said deforming surface includes a radially outer portion having a first inclination relative to the axis of said one component and a radially inner portion having a different second inclination relative to the axis of said one component, said radially outer portion having a first width and said radially inner portion having a different second width in the radial direction of said one component.

72. The fitting of claim 71, wherein the width of said radially outer portion exceeds the width of said radially inner portion.

73. The fitting of claim 72, wherein the width of said radially outer portion is twice the width of said radially inner portion.

74. The fitting of claim 1, wherein said deforming surface includes a radially outer portion having a first inclination relative to the axis of said one component, a radially inner portion having a different second inclination relative to the axis of said one component, and an intermediate portion between said radially inner and radially outer portions.

75. The fitting of claim 74, wherein said intermediate portion has a ring-shaped edge.

76. The fitting of claim 74, wherein said intermediate portion is convex.

77. The fitting of claim 1, further comprising an annular seal disposed within said annulus of prongs and having a portion which is engaged by said first portions due to radially inward movement of said end faces under the action of said deforming surface in response to threading of said components into each other.

78. The fitting of claim 77, wherein said seal extends axially of said clamping device beyond the end faces of said prongs.

79. The fitting of claim 1, further comprising an annular seal within said annulus of prongs, said seal comprising a thinner first portion surrounded by the first portions of said at least some prongs and a thicker second portion surrounded by the second portions of said at least some prongs.

80. The fitting of claim 78, wherein said seal extends at least to the end faces of said prongs.

81. The fitting of claim 1, further comprising an annular seal which is surrounded by said annulus of prongs, said seal having a first axial end in an internal annular socket of said clamping device at the closed ends of said slots and a reinforced second axial end at the end faces of said prongs.

82. The fitting of claim 81, wherein said end faces have recesses for portions of said reinforced second axial end of said seal.

83. The fitting of claim 81, wherein said internal surfaces of said prongs have recesses for portions of said reinforced axial end.

84. The fitting of claim 1, further comprising a deformable annular seal surrounded by said annulus of prongs, said seal having an external surface and an internal surface and at least one of said surfaces of said seal being provided with at least one weakening recess to facilitate deformation of said seal due to radially inward movement of said end faces by said deforming surface in response to threading of said components into each other.

85. The fitting of claim 84, wherein said seal has a plurality of recesses defining substantially trapeziform profiles at said at least one surface of said seal.

86. The fitting of claim 1, further comprising a deformable annular seal surrounded by said annulus of prongs and having a plurality of reinforcing portions.

87. The fitting of claim 86, wherein said prongs have complementary recesses for at least one of said reinforcing portions.

* * * * *